(12) United States Patent
Auslander et al.

(10) Patent No.: US 6,793,723 B2
(45) Date of Patent: Sep. 21, 2004

(54) HOMOGENEOUS PHOTOSENSITIVE OPTICALLY VARIABLE INK COMPOSITIONS FOR INK JET PRINTING

(75) Inventors: Judith D Auslander, Westport, CT (US); John Griffiths, Leeds (GB); John Mama, Leeds (GB)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/143,468

(22) Filed: May 9, 2002

(65) Prior Publication Data

US 2002/0195586 A1 Dec. 26, 2002

Related U.S. Application Data

(60) Provisional application No. 60/289,989, filed on May 10, 2001.

(51) Int. Cl.$^7$ .............................................. C09D 11/02
(52) U.S. Cl. ............................ 106/31.32; 106/31.43; 106/31.58; 252/301.16
(58) Field of Search .................... 106/31.32, 31.43, 106/31.58; 252/301.16

(56) References Cited

U.S. PATENT DOCUMENTS

| | | | |
|---|---|---|---|
| 4,705,567 A | 11/1987 | Hair et al. ..................... | 106/20 |
| 5,084,205 A | 1/1992 | Auslander .................... | 252/301 |
| 5,135,569 A | 8/1992 | Mathias ........................ | 106/22 |
| 5,145,518 A | 9/1992 | Winnik et al. ................ | 106/21 |
| 5,626,654 A | 5/1997 | Breton et al. ................. | 106/31 |
| 5,766,324 A | 6/1998 | Ikegaya et al. ............... | 106/31 |
| 5,877,235 A | 3/1999 | Sakuma et al. .............. | 523/161 |
| 6,103,006 A * | 8/2000 | DiPietro ....................... | 106/493 |
| 6,169,185 B1 * | 1/2001 | Likavec et al. .......... | 548/305.1 |
| 6,234,537 B1 * | 5/2001 | Gutmann et al. ............. | 283/86 |
| 2002/0109765 A1 * | 8/2002 | Sato et al. .................. | 347/100 |

* cited by examiner

Primary Examiner—Helene Klemanski
Assistant Examiner—Veronica F. Faison
(74) Attorney, Agent, or Firm—Charles R. Malandra, Jr.; Angelo N. Chaclas

(57) ABSTRACT

Ink compositions described are suitable for ink jet printing (ink jet inks) and are highly effective for simultaneously imparting visible and fluorescent images. In the preferred forms, both a dark, visible image and a complementary fluorescent image will be visually discernable as well as machine readable to enable efficient hand and automated processing or handling of the objects printed. These results are achieved by ink formulations that moderate the typically occurring phenomenon of quenching while possessing the physical properties necessary for an ink jet ink. In one form, the inks comprise a first colorant comprising at least one fluorescent dye, the fluorescent dye emitting light within a characteristic emission band when excited by fluorescent-exciting radiation; a second colorant having a light absorption band at longer wavelengths than the characteristic emission band of the first colorant, the second colorant comprising a water-soluble polymeric dye of effective molecular configuration to inhibit quenching of fluorescence of said first colorant due to collisional and resonance energy transfer with said second colorant; and an aqueous liquid vehicle comprising water and a water-soluble vehicle in sufficient amounts to achieve an ink viscosity and surface tension effective for application of the ink to a substrate in a predetermined pattern by ink jet printing. The colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation.

41 Claims, 19 Drawing Sheets

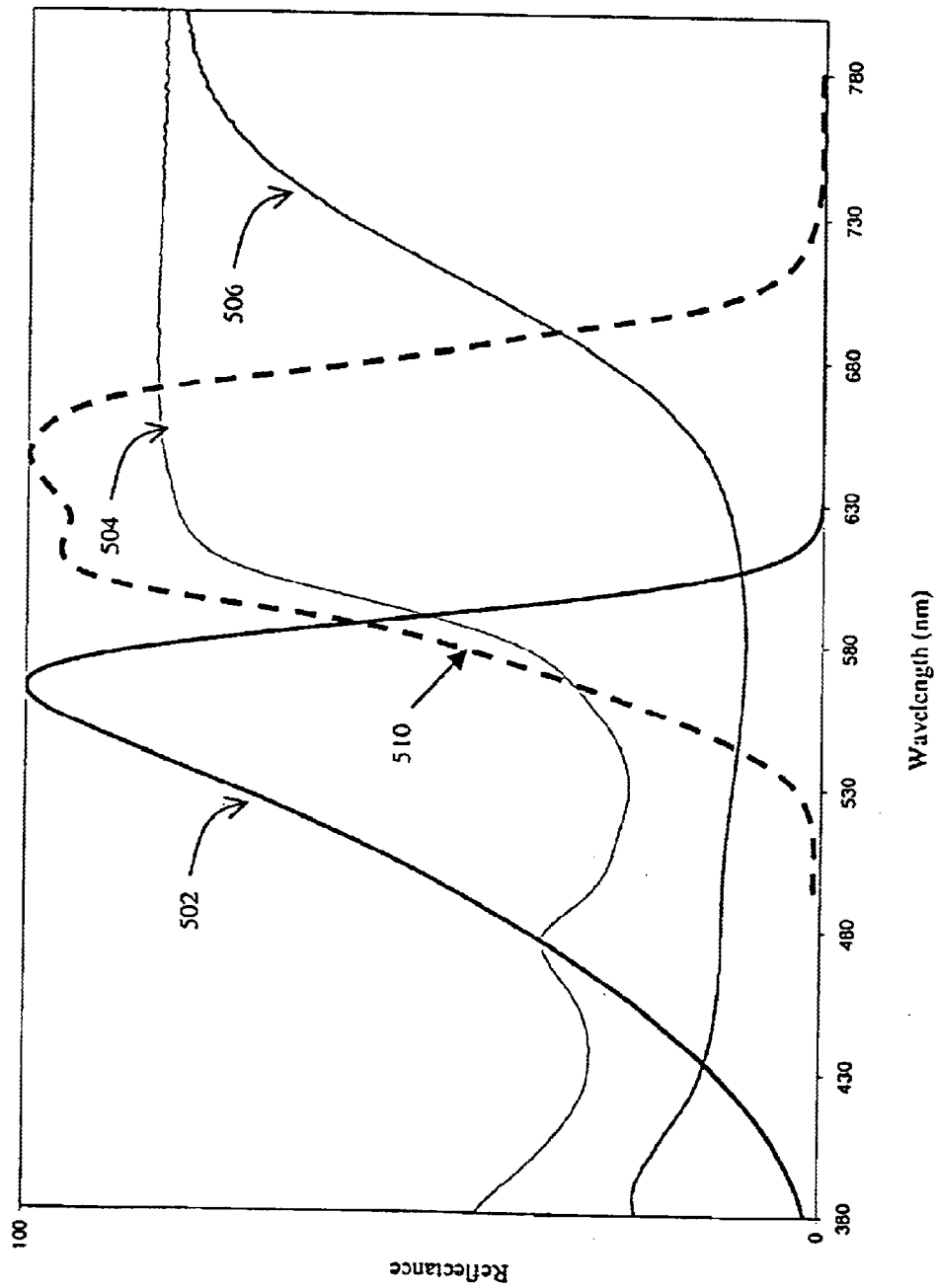

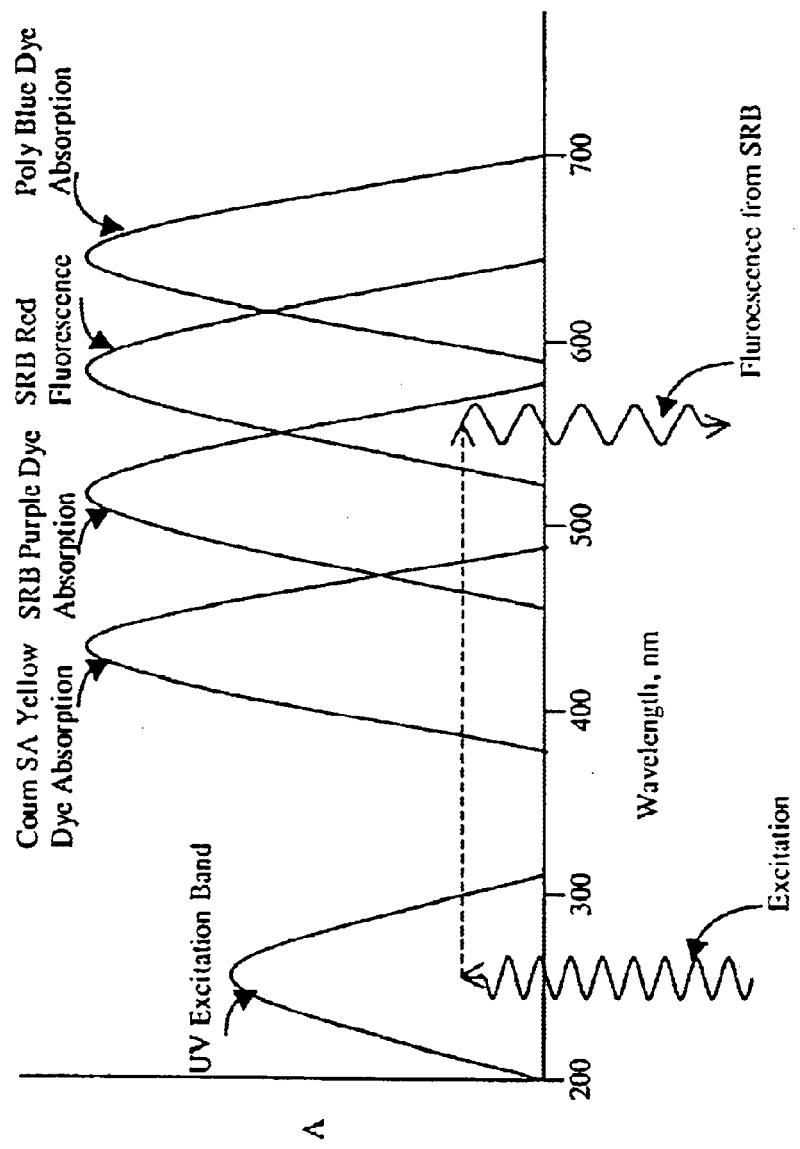

FIGURE 11A

DRAWDOWNS ON WHITE ENVELOPE

| | PMU | O.D | L,a,b | PRD Red | PCR Red | PRD Green | PCR Green |
|---|---|---|---|---|---|---|---|
| Personal Post Office Red Fl. Ink | 99+ (590)* | 0.76 | L=68.5<br>A=60.64<br>B=28.5 | 6% | 0.07 | 35% | 0.46 |
| Ex. 1 | 46 | 0.79 | L=50.18<br>A=4.57<br>B=3.87 | 39% | 0.48 | 38% | 0.48 |
| Ex. 2 | 55 | 0.81 | L=49.70<br>A=4.41<br>B=2.41 | 44% | 0.52 | 43% | 0.51 |
| Ex. 3 | 62 | 0.78 | L=49.86<br>A=0.67<br>B=-1.21 | 42% | 0.54 | 41% | 0.53 |
| Ex. 4 | 67 | 0.84 | L=48.97<br>A=-1.16<br>B=5.61 | 44% | 0.53 | 41% | 0.50 |
| Ex. 5 | 64 | 0.82 | L=50.59<br>A=1.04<br>B=0.91 | 39% | 0.50 | 38% | 0.49 |
| Ex. 6 | 61 | 0.81 | L=51.29<br>A=-1.74<br>B=2.35 | 42% | 0.53 | 40% | 0.51 |

*Calculated value based on extrapolation as described in evaluation section 3: Fluorescence (PMU).

Figure 11B

HIGH RESOLUTION PRINTS ON WHITE ENVELOPE

| 600 x 300 DPI White Sub. | Color (L,a,b) | PMU (small datamatrix) | Fluoromax-2 Fluorescent Intensity (solid area) (cps) | O.D. (solid) | PRD Red | PCR Red (solid area) | PRD Green | PCR Green (solid area) | White Ill. Contrast (datamatrix) | Red Ill. Contrast (datamatrix) |
|---|---|---|---|---|---|---|---|---|---|---|
| Personal Post Office Red Fl. Ink | L=68.37 A=59.27 B=25.12 | 99+ (132)* | 551165 | 0.82 | 8% | 0.10 | 38% | 0.48 | 38% | N/A Cannot be seen. |
| Ex. 1 | L=54.88 A=-3.97 B=3.15 | 20 | 163740 | 0.71 | 45% | 0.53 | 41% | 0.50 | 57% | 65% |
| Ex. 2 | L=56.07 A=-1.03 B=0.36 | 20 | 145760 | 0.81 | 45% | 0.53 | 41% | 0.50 | 57% | 70% |
| Ex. 3 | L=45.70 A=0.03 B=1.69 | 20 | 143645 | 0.81 | 42% | 0.55 | 40% | 0.54 | 68% | 72% |
| Ex. 4 | L=54.48 A=-2.41 B=2.74 | 25 | 145730 | 0.82 | 44% | 0.53 | 40% | 0.48 | 63% | 70% |
| Ex. 5 | L=52.46 A=-1.51 B=1.09 | 24 | 165030 | 0.78 | 45% | 0.55 | 42% | 0.51 | 60% | 72% |
| Ex. 6 | L=59.16 A=-2.98 B=0.47 | 22 | 168810 | 0.78 | 45% | 0.56 | 41% | 0.53 | 65% | 72% |

*Calculated value based on extrapolation as described in evaluation section 3: Fluorescence (PMU).

FIGURE 11C

HIGH RESOLUTION PRINTS ON KRAFT ENVELOPE

| 600 x 300 DPI White Sub. | Color (L,a,b) | PMU (small datamatrix) | Fluoromax-2 Fluorescent Intensity (solid area) (cps) | Δ O.D. (solid) | PRD Red | PCR Red (solid area) | PRD Green | PCR Green (solid area) | White Ill. Contrast (datamatrix) | Red Ill. Contrast (datamatrix) |
|---|---|---|---|---|---|---|---|---|---|---|
| Personal Post Office Red Fl. Ink | L=52.22 A=49.17 B=19.62 | 48 | 285890 | 1.08 |  |  |  |  | 26% | N/A Cannot be seen. |
| Ex. 1 | L=51.08 A=6.82 B=19.86 | 10 | 61400 | 0.99 | 9% | 0.14 | 16% | 0.33 | 34% | 43% |
| Ex. 2 | L=44.55 A=3.42 B=11.10 | 12 | 65560 | 1.00 | 29% | 0.47 | 17% | 0.35 | 34% | 47% |
| Ex. 3 | L=43.24 A=3.94 B=9.95 | 11 | 68425 | 1.01 | 31% | 0.50 | 19% | 0.39 | 35% | 46% |
| Ex. 4 | L=52.64 A=4.59 B=23.01 | 13 | 77670 | 0.97 | 30% | 0.54 | 26% | 0.44 | 33% | 48% |
| Ex. 5 | L=46.81 A=2.94 B=17.57 | 13 | 70165 | 0.98 | 31% | 0.50 | 19% | 0.39 | 34% | 47% |
| Ex. 6 | L=42.45 A=2.60 B=10.86 | 11 | 71210 | 0.99 | 32% | 0.49 | 17% | 0.35 | 33% | 49% |

Figure 12

Physical Properties

The physical properties of the liquid ink compositions are listed below:

|  | Ex. 1 | Ex. 2 | Ex. 3 | Ex. 4 | Ex. 5 | Ex. 6 |
|---|---|---|---|---|---|---|
| Viscosity @ 25 °C (centipoise) | 3.2 | 2.2 | 1.8 | 4.1 | 2.8 | 2.2 |
| Surface Tension (dynes/cm) | 35.0 | 34.3 | 32.5 | 33.3 | 32.6 | 32.6 |
| pH | 6.78 | 6.70 | 7.83 | 6.40 | 6.92 | 8.05 |

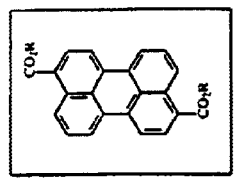
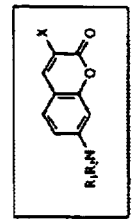
Neutral, anionic and cationic perylene dyes
Cationic Coumarins
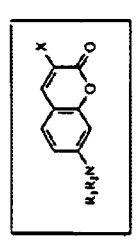
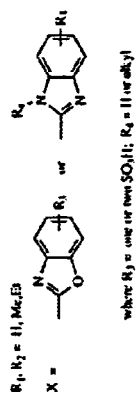
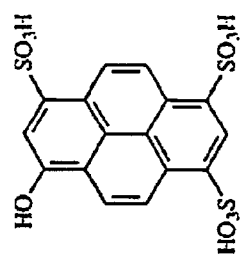
Anionic Coumarins
Pyranine (anionic pyrene dye) (P120)
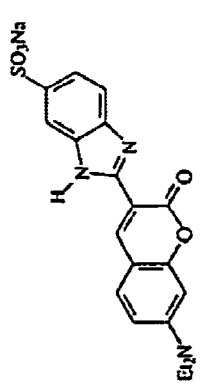
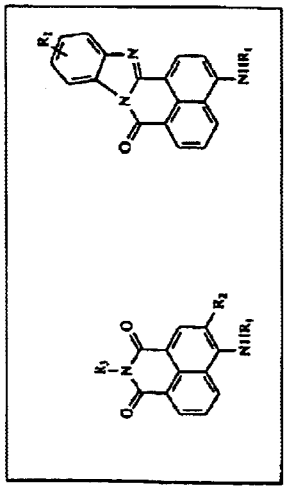
Coumarin sulphonic acid (Coum SA)
Anionic Naphthalimide dyes
FIGURE 13 – Yellow or Orange Fluorescent Dyes

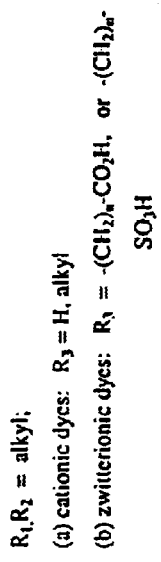
$R_1, R_2$ = alkyl;
(a) cationic dyes: $R_3$ = H, alkyl
(b) zwitterionic dyes: $R_3$ = -(CH$_2$)$_n$-CO$_2$H, or -(CH$_2$)$_n$-SO$_3$H
Pyronines
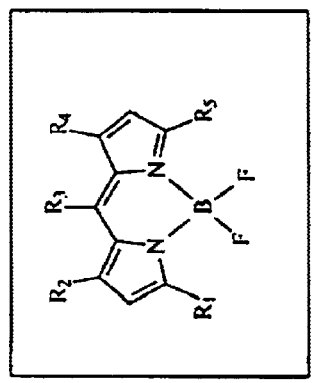
$R_1 - R_5$ = alkyl, substituted alkyl, aryl, substituted aryl
Bispyrromethane boron complexes
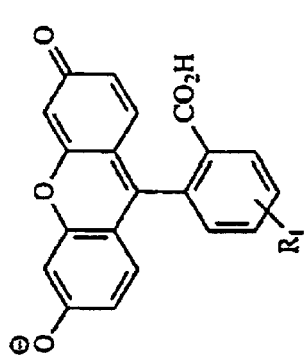
$R_1$ = H, alkyl, Cl, Br
Anionic Xanthene Dyes
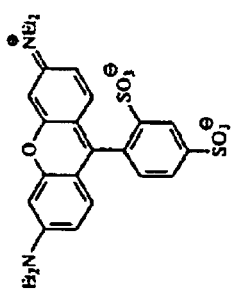
Sulphorhodamine B (SRB)
FIGURE 14
Red or Purple Fluorescent Dyes Blue Polymeric Dye

HOMOGENEOUS PHOTOSENSITIVE OPTICALLY VARIABLE INK COMPOSITIONS FOR INK JET PRINTING

CROSS-REFERENCE TO RELATED APPLICATIONS

This application claims priority from U.S. Provisional Application Ser. No. 60/289,989, filed on May 10, 2001, the specification of which is hereby incorporated by reference.

BACKGROUND OF THE INVENTION

The invention provides ink compositions for ink jet printing (ink jet inks), which are highly effective for simultaneously imparting visible and fluorescent images. In the preferred forms, both a dark, visible image and a complementary fluorescent image will be visually discernable as well as machine readable to enable efficient hand and automated processing or handling of the objects printed. The invention achieves these results through the development of ink formulations that moderate the typically occurring phenomenon of quenching while possessing the physical properties necessary for an ink jet ink.

It is generally known to employ automated detectors which are responsive to images with high reflective contrast in the visible region of the spectrum for the machine processing of various types of information-bearing tickets, tags, labels, postage indicia and similar security markings. It is further known to employ automated detectors that are responsive to fluorescent emissions of security markings resulting from excitation at a shorter wavelength such as ultraviolet (UV) excitation. In the postage meter art, for example, mail pieces carrying postage indicia printed with fluorescent ink enhance machine processing. In the United States and Canada automatic equipment correctly faces or orients individual mail pieces by detecting red-fluorescence of postal indicia attached to mail pieces. Postal Service facing equipment employs a simple detector to locate the fluorescence. While useful, detectors of this type do not verify that the fluorescence and the indicium image are physically coincident.

Generally, a fluorescent material fluoresces in a defined region of the spectrum upon exposure to a shorter wavelength excitation light such as UV light. As used herein, the term "fluorescent security marking", refers to such an image. Desirably, the marking will be "red-fluorescent", which term is used herein to refer to fluorescence in the red region of the spectrum as opposed to indicating the visible color of the ink. The shift in wavelength between the incident excitation light and the fluorescent emission clearly distinguishes fluorescence from direct reflection. Fluorescent security markings are effectively applied to detection of forged documents, such as tickets, securities, identification cards, security papers, and the like. The difficulty of copying the fluorescence of security markings deters copying and provides forensic evidence of counterfeits. Among the applications of these security markings are detection of articles, production marking, and automatic article identification. Intensity of the fluorescence is important to the success of these applications. Unfortunately, application of inks by ink jet printing so limits the physical properties of the inks that the normal tendency of the colorants in the ink to quench any fluorescence presents a major technical challenge.

The prior art has provided inks for rotary and other letter press postage meters to imprint indicia on envelopes with platens using ink impregnated into foam or other porous media. Red-fluorescent, colored inks have been made for letterpress meters and include red, blue, green and black inks. For example, U.S. Pat. Nos. 2,681,317, 2,763,785, 3,230,221, 3,560,238, 3,928,226 and 4,015,131 disclose red-fluorescent inks for this purpose. These inks, in general, have non-aqueous, solvent-based vehicle systems with low vapor pressures. Typically, they will have a high solids concentration, a high viscosity, a high boiling temperature and a low surface tension.

Unfortunately, letterpress technology lacks the ability of digital printing to print variable information, and the inks are not useful in ink jet printers, which require stable solutions or dispersions with small particle sizes, low viscosity and a specified surface tension. Special inks must be produced before the many advantages of ink jet printing technology can be realized. They must be low in viscosity and have specific, high surface tension properties to function properly. Beyond that, they must provide high image contrast at low solids concentrations. The viscosity of the liquid ink jet inks is typically from 1.5 to 15 centipoise (cps) in current piezoelectric ink jet printers and about 1 to 5 cps in thermal ink jet printers. A desirable range of surface tension of ink jet printer inks is between 30 to 50 dynes/cm.

These criteria have deterred the development of some fluorescent ink jet inks, but have not permitted any to date that are visually-dark and give high print contrast. A number of red-colored aqueous red-fluorescent inks are disclosed in U.S. Pat. No. 5,681,381 and U.S. Pat. No. 6,176,908, and those inks fulfill United States Postal Service (USPS) requirements for franking while being compatible with use in an ink jet printer. These inks are also stable for extended periods of time. They are based on water, co-solvent and penetrant solutions of water-soluble fluorescent toners. In order to achieve fluorescence with the required fluorescent signal, e.g., phosphor meter unit (PMU), these inks are designed with an optical density lower than that normally required for machine recognition at all wavelengths. These ink formulations are, however, limited in their utilities due to their color and their inapplicability to black or other dark inks.

Postage indicia and franking machines have been developed to make use of digital printing and especially ink jet printing. They have utilized both dark, high-contrast inks and fluorescent inks separately, but no single dark, high-contrast, fluorescent ink has been available. For example, red and purple-colored, red-fluorescent indicia have been printed with variable data using digital printers. Digitally printed indicia provide significant advantages over letterpress indicia. Ink jet printing enables printing indicia with high-density, variable information. Pitney Bowes' PostPerfect® meter produces a red-colored red-fluorescent indicium with variable data by thermal transfer printing while the Personal Post Office™ system produces red-colored, red-fluorescent indicia by ink jet printing. The USPS "Information-Based Indicia Program" (IBIP) allows the use of a black machine-readable indicia. The Post Office equipment typically orients mail pieces bearing IBIP indicia using a facing identification mark (FIM) or by fluorescent tags added to the indicia. However, because there is no fluorescent black ink available for ink jet printing and using an FIM printed at the edge of an envelope is difficult, the IBIP use is limited.

Postal services utilize machine-readable variable information for a variety of value-added services, for cryptographic authentication of the indicium and for obtaining marketing information. Compared to letterpress technology, digital printers can provide print quality and contrast that do not decrease with the number of prints. The images can be printed at high resolution, with high quality and at high speeds by direct, non-impact print engines. These inks have additional advantages for security markings since they may include penetrating solvents that cause the selective penetration of colorant into the paper. This penetration provides rubbing and scratch resistance to the security markings. Unfortunately, the use of ink jet printing for postage franking is restricted, to some extent, by the present lack of inks functional with ink jet technology that are simultaneously suitable for franking and machine-readability.

Information contained in printed indicia is useful for security and marketing purposes, as well as for processing the mail. In particular, the IBIP contains high-density variable cryptographically protected information in a two-dimensional bar code. To capture this information, postal scanning equipment must efficiently detect and read the information-based indicium. Postal indicia must display sufficient contrast in reflection to enable machine-readability, regardless of the substrate. However, available red-fluorescent inks tend to exhibit low contrast, inhibiting their ability to be reliably read by optical character recognition (OCR) equipment, bar code readers and other types of machine vision technology. These systems often have illumination and detection systems in the red region of the spectrum, limited by laser systems. The substrate can also limit machine readability. On dark substrates, such as Kraft envelopes with a reflectance of between 0.45 and 0.6, it is very difficult to achieve sufficient contrast with red inks. Therefore, there is a strong need for printing security markings which exhibit high contrast, preferably black, and simultaneously fluorescence, particularly red-fluorescence.

Another challenge to the achievement of inks for security features having practical utility is that there are a large variety of commercially-available organic luminescent compounds that might confuse security systems based on currently-available inks. Common examples of these organic luminescent compounds are the optical brighteners and commercially available colored-fluorescent materials and inks—all lighter-colored inks. These might permit fraudulent replication of indicia, e.g., printed in red or green, by substitution of a luminescent substance that emits light of a similar color for an authentic material. This type of normally-available organic luminescent compound could not provide visually-dark and red-fluorescent images. It is, however, another reason why it would be advantageous to provide fluorescent inks with unique optical properties that cannot be easily simulated with materials that are readily available.

The achievement of suitable ink jet inks with suitable physical and fluorescing characteristics presents a major technical challenge because of the physical characteristics required of the fluid ink and a typical fluorescence phenomenon known in the art as quenching. Thus, there are technical reasons why dark, fluorescent inks are not available. The problem of quenching will be explained briefly below.

In the fluorescence process, the absorption of a light quantum by a molecule brings it to an excited singlet state. The time of absorption is about $10^{-15}$ seconds. From the excited, singlet state, light is emitted to the ground level as fluorescence. The $10^{-9}$ second duration of the fluorescence process is much longer than the absorption process. Four separate processes affect the observed fluorescence. In one, not quenching, competing light absorption from other dyes can reduce the observed fluorescence due to less light being absorbed by the fluorescent dye. In another, ("trivial mechanism" of quenching) absorption by other dyes of the light emitted by the fluorescent dye will reduce the observed fluorescence. In the third, quenching can occur by collisional energy transfer between the excited fluorescent dye molecule and a non-fluorescent dye molecule when the two come into close contact. The fourth mechanism, called resonance energy transfer, does not involve contact of the two molecules and can occur over a considerable distance.

The lifetime of a fluorophore can be related to the concentration of a quencher by the Stern Volmer equation, $\tau_0/\tau = 1 + K_{sv}(Q)$, where $\tau_0$ is the lifetime of the fluorophore in the absence of the quencher, $K_{sv}$ is the lifetime of the fluorophore in the presence of the quencher, $K_{sv}$ is the Stern Volmer constant and Q is the quencher concentration. As the concentration of the quencher increases, the excited state of the fluorophore is quenched causing a reduction in the lifetime.

One quenching mechanism is transfer of the energy absorbed by a donor molecule to an acceptor molecule. Unless the acceptor molecule is a fluorophore, i.e., a fluorescent dye, the energy transfer process will deactivate the excited state and quench the fluorescence. If the acceptor is a fluorophore, the energy transfer can excite the acceptor, which then fluoresces at a longer wavelength. This process of donors fluorescing in the short-wavelength, visible region of the spectrum while the absorption spectra of the acceptor overlaps the emission spectra of the donor and, as a result, the acceptor fluorophores fluoresce more strongly at longer wavelengths, is known as cascading. The selection of a mixture can also result in the absorption spectrum of the acceptor overlapping the fluorescence spectrum of the donor. In such a case, the resultant effect is the sensitization or enhancement of the light emission of the acceptor.

In order to achieve a conventional black ink based on water-soluble dyes, a single dye or a mixture of dyes is required which will absorb across the entire visible spectrum, from 390 nm to ca. 680 nm. If a single dye is to be used, it must exhibit very broad absorption and/or multiple visible absorption bands. If mixed dye systems are to be used, this would require at least two dyes (orange and violet with broad absorption bands), or more usually three dyes (e.g. yellow, purple and blue). Such a mixed black system would not normally show red-fluorescence, both because of competition among the various dye components for the UV light and because of efficient quenching of the fluorescence. The quenching results from energy transfer to those non-fluorescent dyes in the composition that have absorption bands overlapping with the emission band of the fluorescent dye, most significantly to the blue dye component of the mixture. Such energy transfer could occur by collisional transfer where the non-fluorescent acceptor diffuses to the donor, at a distance by resonance transfer, or by the so-called "trivial" mechanism whereby the blue dye absorbs any red emitted light. Similar problems exist with available inks based on the use of one or more pigments or dyes.

From the above discussion, it can be seen that currently-available inks for ink jet printing cannot provide high-contrast visible images as well as fluorescent images suitable for security markings. There remains a technical challenge to the provision of such inks, which would be highly desirable if available.

SUMMARY OF THE INVENTION

Thus, it is an object of this invention to provide a photosensitive optically-variable, e.g., fluorescent, ink jet ink which produces a high contrast, e.g., machine-readable, image in reflection.

Another object of the invention is to provide a means to inhibit the normal quenching of fluorescence that deters the production of a useful a fluorescent ink jet ink capable of producing a high contrast machine-readable image in reflection.

It is another object of the invention to provide a multi-component ink formulation of the type described with components that differentially adhere to the paper substrate, thus making alteration or non-destructive transfer to a counterfeit document extremely difficult.

It is another object of the invention to provide fluorescent inks with unique optical properties that cannot be easily simulated with materials that are readily available.

It is yet another object of the invention to provide an ink of the type described useful as a forensic verifier in that it can verify that the dark regions and the fluorescent regions of a security marking are coincident.

These and other objects are achieved by the invention which provides inks suitable for ink jet printing, a process for preparing such inks, a printing process using the inks and printed substrates bearing images printed with the inks.

In one aspect, an ink of the invention will be defined as a homogeneous, aqueous ink capable of producing dark, machine-readable markings exhibiting fluorescence when exposed to fluorescent-exciting radiation, the ink being of suitable viscosity and surface tension for use in ink jet printing, comprising: (a) a first colorant comprising at least one fluorescent dye, said fluorescent dye emitting light within a characteristic emission band when excited by fluorescent-exciting radiation; (b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional energy transfer with said second colorant; and (c) an aqueous liquid vehicle comprising water and a water-soluble vehicle in sufficient amounts to achieve an ink viscosity and surface tension effective for application of the ink to a substrate in a predetermined pattern by ink jet printing; wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation. Desirably, within the spectral range of interest of from about 390 to 680 nm, the ink reflectance is less than 50% of the paper reflectance.

In preferred ink formulations, a fluorescence stabilizer, i.e., a material capable of limiting the loss of fluorescence due to migration of the ink into a porous substrate, will also be employed. Also preferred is the use of surfactants to adjust physical properties. Many other preferred and alternative aspects of the invention are described below.

BRIEF DESCRIPTION OF THE DRAWINGS

The invention will be better understood and its advantages more apparent when the following detailed description is read in light of the accompanying drawings, wherein:

FIG. 4 is a graph illustrating reflection spectra for example black and red inks superimposed on the spectral factor of an orthochromatic filter.

FIG. 6 is a schematic illustration summarizing the direct fluorescence process in one type of homogeneous ink of the invention.

FIG. 11A is a table of reflectance and fluorescence properties of a drawdown of example homogeneous inks compared with traditional meter ink.

FIG. 11B is a table of reflectance and fluorescence properties of high-resolution meter imprints of example homogeneous inks on white envelopes compared with traditional meter ink.

FIG. 11C is a table of reflectance and fluorescence properties of high-resolution meter imprints of example homogeneous inks on kraft envelopes compared with traditional meter ink.

FIG. 12 is a table of physical properties of exemplified homogeneous inks.

FIGS. 13 to 15 show some of the dye structures used in the homogeneous formulations.

DETAILED DESCRIPTION

Figure 1:
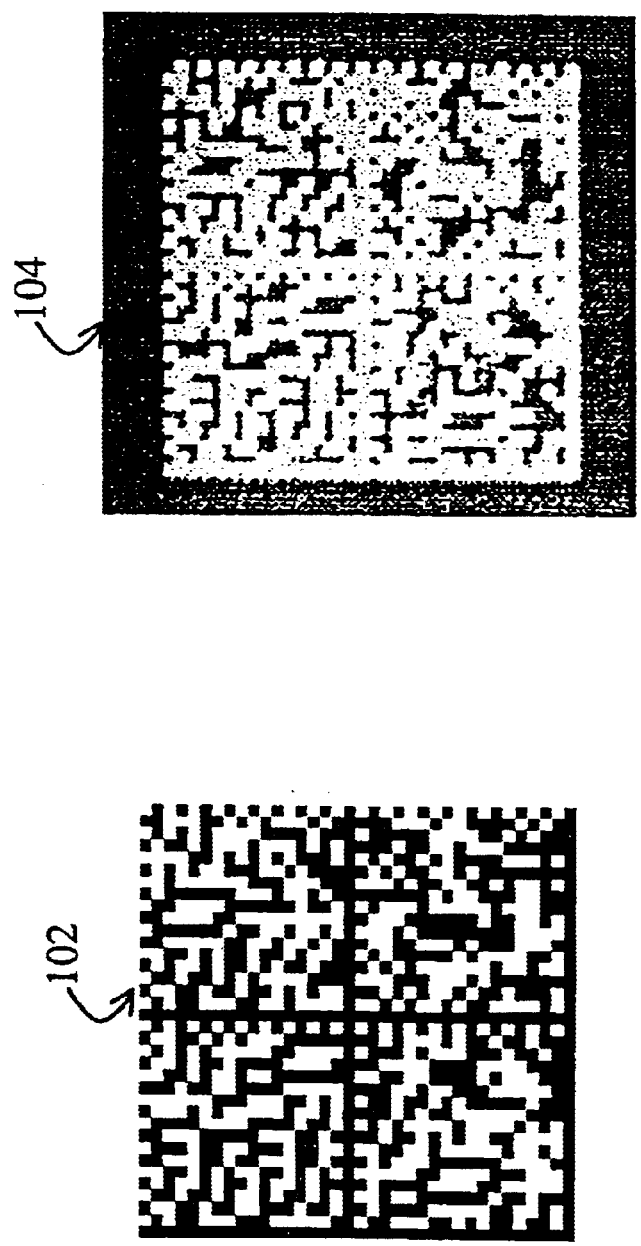
FIG. 1 illustrates both visible and fluorescent images enabled by printing the inks of the invention on a substrate, one of a printed substrate in reflection under illumination by visible light and one of the same printed substrate fluorescing under ultraviolet excitation.

The ink compositions of the invention are illustrated below in preferred forms and are, in these forms and others, highly effective for ink jet imprinting visible and fluorescent images, both preferably being machine readable. The visible images are clear to normal human sight and effective for use with various image-reading machines operable for light in the visual range. The images are also sufficiently fluorescent, despite quenching due to the presence of colored dyes or pigments, to provide machine-readable fluorescent images which are substantial negatives of the visible images. Before providing specific examples of inks, the principal components of the inks will be described. Desirably, within the spectral range of interest (SROI), e.g., from 390 to 680 nm (visible range), the ink reflectance is less than 50% of the paper reflectance.

The inks of the invention are capable of imagewise application by ink jet printing and of providing machine-readable images when exposed to visible and fluorescent-exciting radiation. For an ink to be effectively used by ink jet printing, it must have a suitably low viscosity, yet have sufficient solids for it to achieve sufficient fluorescence and visible light reflectance to provide discernable images when dried. Preferably, the dry inks will provide machine-readable images on a wide variety of substrates.

The inks will contain an aqueous liquid vehicle comprising water and a water-soluble vehicle in sufficient amounts to achieve an ink viscosity and surface tension effective for application of the ink to a substrate in a predetermined pattern by ink jet printing. For thermal ink jet printing, the viscosity should be within the range of from 1 to 5 cps when measured Haake Viscotester at 25° C. (see test method below), preferably from 2 to 4 cps, and exhibit a surface tension of from 20 to about 80 dyne/cm when measured by Fisher Surface Tensiomat at 25° C. (see test method below), preferably from 30 to 50 dyne/cm. For ink jet printing by piezoelectric means, the viscosity should be within the range of from 1.5 to 15 cps when measured by the above method, preferably from 2 to 12 cps. The inks of the invention have particularly good properties in these regards as can be seen from the data, especially in FIG. 12.

In order to achieve a conventional black ink based on water-soluble dyes, a single dye or a mixture of dyes is required which will absorb across the entire visible spectrum, from 390 nm to ca. 680 nm. If a single dye is to be used, it has to have very broad absorption and/or multiple visible absorption bands. If mixed dye systems are to be used, this would require at least two dyes (orange and violet with broad absorption bands), or more usually three dyes (e.g. yellow, purple and blue).

To obtain simultaneous red fluorescence in ultraviolet light in the desired region of 580–630 nm, one would also have to absorb fluorescence exciting radiation, e.g., UV light, efficiently and fluoresce efficiently between 580 and 630 nm. However, such a mixed black system would not normally show red fluorescence in ultraviolet light, for the following reasons: (a) efficient quenching of the fluorescence of the fluorescent dye would occur, and (b) there would be competition among the various dye components for the UV light.

In the case of fluorescence quenching, the excited singlet state of the red-fluorescent dye, produced after activation with UV light, will undergo energy transfer to those non-fluorescent dyes in the composition that have absorption bands overlapping with the emission band of the fluorescent dye. This will most significantly be to the blue dye component of the mixture. Such energy transfer could occur by collisional transfer, or could occur at a distance by resonance transfer, or could occur by the so-called "trivial" mechanism, whereby any red emitted light will be absorbed by the blue dye.

It is clear that the production of a black, red fluorescent ink, based on water-soluble dyes poses a considerable challenge.

The inks of the invention include a mixture of colorant components, a first one of which comprises a fluorescent dye and a second of which comprises a dark polymeric dye comprising a means to inhibit the normal quenching of fluorescence of the first colorant by the second. Quenching deters the production of fluorescent ink jet ink capable of producing a high-contrast, preferably machine-readable, image in reflection. The invention reduces quenching and achieves visible contrast with fluorescence by sterically preventing close contact between the excited fluorophore and the quencher, and so minimizing collisional and resonance transfer. The ink compositions of the invention will also include a multi-component colorant mixture and an aqueous, liquid carrier. In preferred forms they will also include a component which enhances fluorescence, typically an aprotic solvent. Also, the dyes should have the same ionic characteristic, i.e., anionic, zwiterionic, neutral and cationic.

In all cases, the inks will contain a colorant (referred to as the first colorant) which is fluorescent when exposed to fluorescence-exciting radiation. In addition, the inks will contain a combination of other colorants, which together impart a high-contrast, visibly-dark image on a variety of substrates. Preferred inks will produce a virtually black image but can be characterized by other dark colors such as gray, blue or purple. The inks of the invention have the advantage that they impart machine-readable images when illuminated with both visible light and fluorescent-exciting radiation. Desirably, the images are of high definition on coated and uncoated papers in a wide range of colors and hues, including at least the range of from white to manila and kraft paper.

Figure 7:
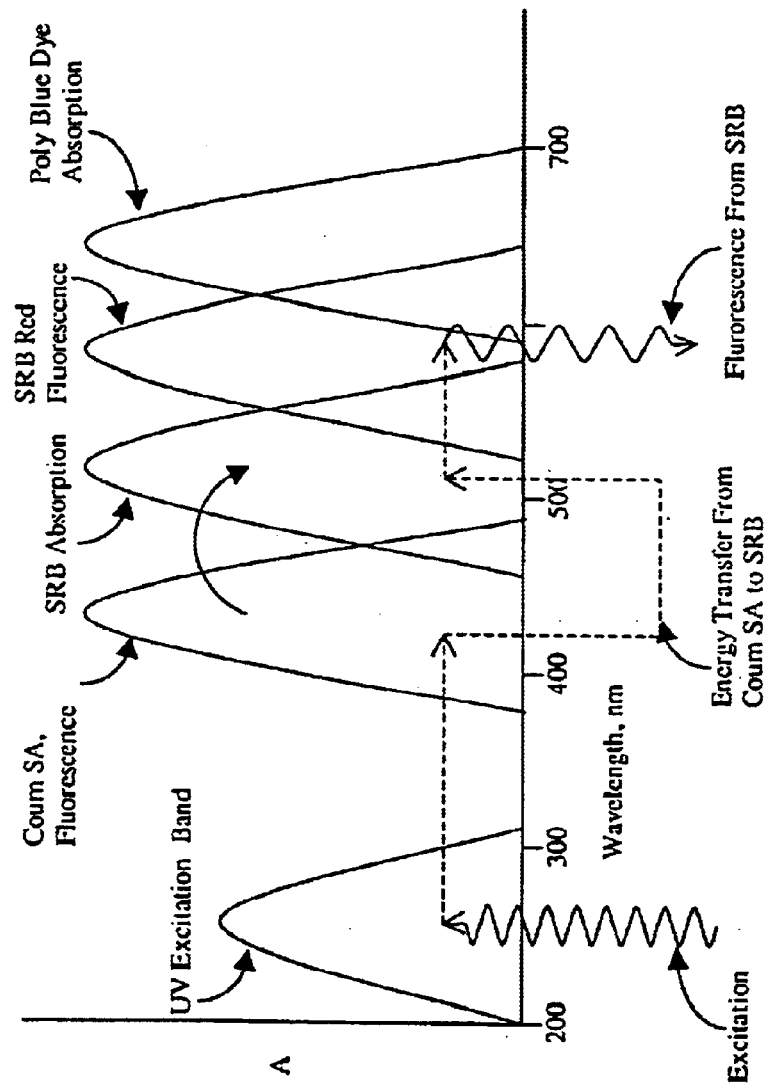
FIG. 7 is a schematic illustration summarizing the cascade energy transfer fluorescence process in another type of homogeneous ink of the invention.

The inks of the invention can achieve fluorescence by direct excitation and fluorescence of a first colorant dye (as illustrated in principal in FIG. 6) which can be enhanced by a cascading process (as illustrated in principal in FIG. 7). These absorption and emission processes are shown in FIGS. 6 and 7 with respect to exemplary dyes.

In FIG. 6 a particular red dye, Sulphorhodamine B (SRB), is employed as part of the first colorant. The absorption of the excitation energy at 254 nm by the SRB results in a higher excited state of the SRB, which rapidly internally converts to its lowest excited singlet ($S_1$) state, and then fluoresces from this. The whole process occurs within the SRB molecule and thus the other dyes present in the formulation play no role in energy transfer, other than to act as potential quenchers.

Alternatively as shown in FIG. 7, the absorption of the excitation energy at 254 nm occurs by sensitization (energy transfer) by a particular yellow dye, Coumarin sulphonic acid, with green fluorescence. This could cascade energy transfer to the $S_1$ state of the SRB, followed by fluorescence from SRB. In this situation it is important that the Coumarin sulfonic acid, or the other yellow dye, have high fluorescence efficiency, and that its emission band overlaps well with the absorption band of the SRB.

It is an advantage of the invention that the decreased fluorescent emission from the ink, resulting from a major problem with such a formulation, i.e., the inevitable overlap between the SRB fluorescence emission band and the absorption band of a necessary blue dye, is significantly diminished. That is, the invention provides inks with greater fluorescence. Most of the blue dyes that are mono-molecular (not polymeric dyes) show that almost any soluble blue dye will drastically quench the SRB fluorescence, even if such a dye had an absorption maximum lying well towards 700 nm. It has been found, however, that polymeric blue dyes are more efficient in this respect, in not being an effective quencher due to the polymeric chains that help prevent collisional and resonance energy transfer quenching, due to the increased radius of the quencher.

One explanation for this phenomenon is that the blue is physically separated in some way from the fluorescing species, thus preventing energy transfer taking place. While not wishing to be bound by any theory, we conclude that the polymeric side chains on the dye that are responsible for this separation. The steric shielding and especially the radius of the quencher molecule can be an effective barrier to quenching. In our case the radius of the polymeric dyes can vary between 20 Angstrom units or less up to 500 Angstroms and more.

Another important characteristic of the blue dyes is their extinction coefficient. In general, the extinction coefficient $\epsilon$ should be higher than about 10000 $IM^{-1}$ $cm^{-1}$, e.g., of this order or reasonable variations of it, but is not essentially so restricted.

The inks of this invention are utilized in a number of ink jet printing operations, giving visible dark and fluorescent images. FIG. 1 illustrates both visible and fluorescent images enabled by printing the inks of the invention on a substrate, one of a printed substrate in reflection under illumination by visible light and one of the same printed substrate fluorescing under ultraviolet excitation.

The term Photosensitive Optically Variable (POV) security marking as used herein refers to a printed visually black or dark gray machine-readable information-bearing marking that fluoresces in a specific wavelength range when excited with a shorter wavelength light. The POV security marking exhibits visual light absorption throughout the entire visual spectrum including the red region of the visible spectrum where red inks are invisible to typical automatic scanning systems. These inks will achieve acceptable PCS (Print Contrast Signal) on dark papers such as Kraft or Manila.

An application of a POV security marking in the field of postage evidencing is a black postage indicium that fluoresces in the red region of the spectrum when illuminated with ultraviolet light. FIG. 1 shows machine-scanned images 102 and 104 of a POV security marking including a Data-Matrix bar code. Any other symbology such as a one-dimensional bar code, other types of two-dimensional bar code, printed watermarks, or OCR characters may be employed in a POV security marking. The image scanned in reflection 102 was obtained by illuminating the marking with visible light. The low reflectance of the black ink results in dark areas of the scanned image corresponding to printed areas of the security marking. The image scanned in fluorescence 104 is obtained by viewing the visible red-fluorescent emissions under ultraviolet (UV) illumination. The scanned image 104 shows that the security marking emits visible light when illuminated with UV light resulting in light areas in the scanned image corresponding to the printed areas. Comparison of images 102 and 104 shows that the fluorescing image is a negative of the reflective image, i.e., there is a strong negative correlation between the two images.

Forensic characteristics are important to value metering applications such as postal payment and to other security applications. Other security applications of fluorescent inks include security papers and documents. Thus, even after the removal of the visible dark color the remaining fluorescent image 104 will provide forensic evidence of what was printed. In the present invention, the difference in penetration between the fluorescent and non-fluorescent components provides forensic evidence of the presence of the marking after the visible components have been removed.

A security marking printed with a general purpose black ink is easily copied or modified. Verification of the authenticity of the data such as by verifying a cryptographic digital signature included in the bar code data can detect data modification, but not copying. The machine-readable fluorescent ink disclosed herein provides a barrier against undetectable copying. Frequently, fluorescence is added to colored inks to increase the brightness. There is no general commercial incentive to produce visually dark fluorescent inks for graphics purposes, so the machine-readable fluorescent ink can be a unique controlled supply item for the specific intended purpose.

These POV security markings may be produced by digital printing, thermal transfer or electrophotography. In particular, the markings may be produced with the water-based inks disclosed herein through ink jet printing.

Figure 2:
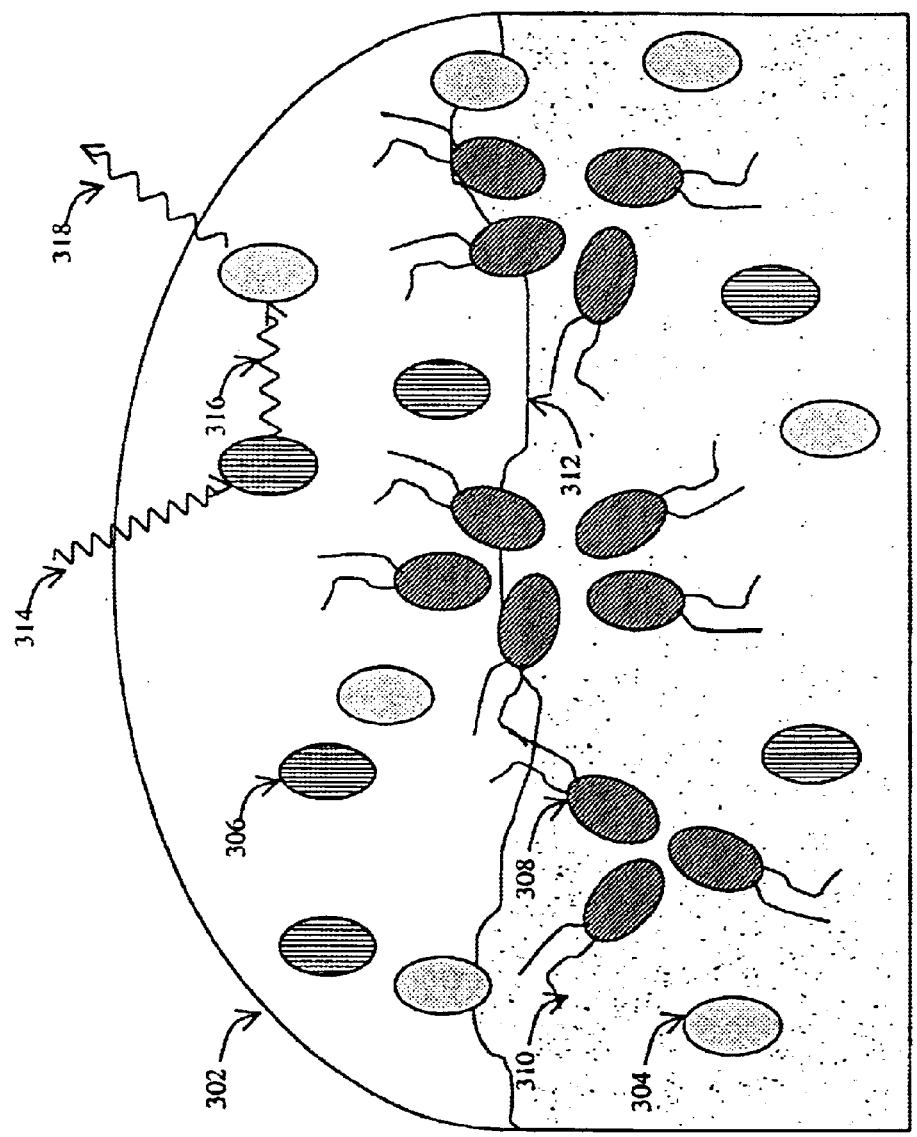
FIG. 2 is schematic illustration, in cross section, of a homogeneous ink sample penetrating paper.

FIG. 2 is schematic illustration, in cross section, of a homogeneous ink sample of the invention penetrating paper. Fluorescence in fluids is typically quenched by transfer of the energy absorbed from the excitation source to neighboring non-fluorescing particles (or droplets). One method to limit quenching is by maintaining a physical separation between the fluorescing particles and the particles that could act as acceptors for the excitation energy, i.e., by steric hindrance. FIG. 2 shows generally at 302 an example of a homogeneous ink sample. The drop 302 of this example comprises three colored dyes 304, 306 and 308 in concentrations balanced to obtain a machine-readable, visually-black ink. The dye molecules 308 include polymer chains 310 with hydrophilic tails. These dye molecules are energetically favored to form in groups with the hydrophilic polymer tails directed outwards. These polymers keep the fluorescent particles at a sufficient distance from the fluorescent dye molecules 308 to limit quenching by steric hindrance. The drop is shown penetrating the paper substrate at 312. When illuminated with short wavelength excitation light 314 the drop emits longer wavelength light 318 by fluorescence. The fluorescence may be enhanced by cascading the excitation energy through an intermediate wavelength light 316 by the well known sensitization process. This can occur for example between the yellow and red dyes.

Figure 3:
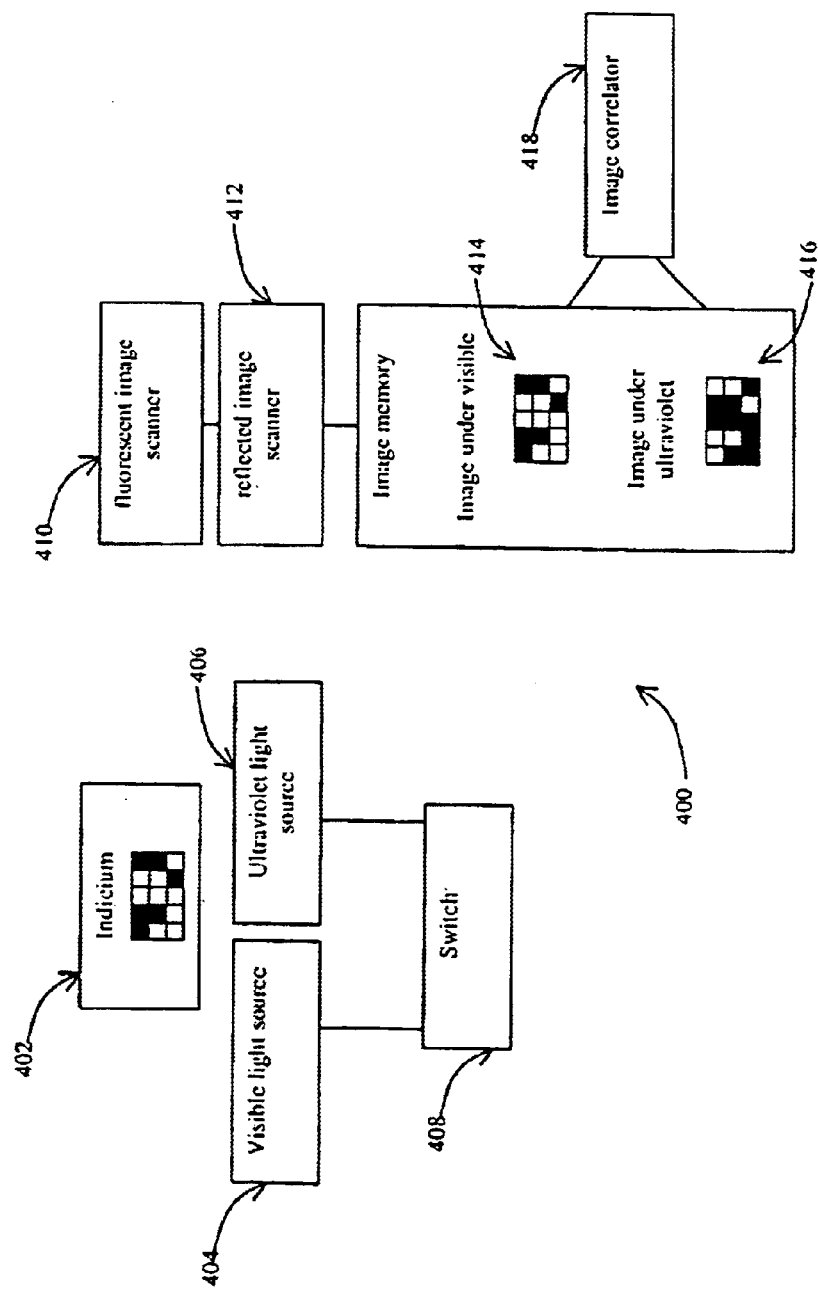
FIG. 3 is a schematic illustration of a system for scanning an optically variable image comprised of the ink of the invention printed on a substrate.

FIG. 3 is a schematic illustration of a system for scanning an optically variable image comprised of the ink of the invention printed on a substrate. Verifier systems that read and verify the indicium bar code data can check that the data in the bar code is self-consistent and consistent with the other information associated with application. In the postage-evidencing field, for example, An IBIP indicium contains a cryptographic digital signature and contains information about the postage meter, the mailer and the recipient of the mail piece. Such verifiers can only detect duplicates by comparing the indicium data with the data in all previously detected indicia. This is an expensive and cumbersome process. A verifier system of this type cannot directly verify if the indicium is original.

A POV security marking is shown generally at 402. A forensic verifier 400 for authenticating the security marking 402 is a specialized verifier system that checks the forensic properties of the security mark in addition to verifying the data. The forensic verifier thus provides a direct check of the originality of the security marking.

A counterfeiter without access to a printer with machine-readable fluorescent ink can produce a security mark that fluoresces and is machine-readable by printing the copied indicium over a fluorescent background, or by applying a fluorescent material over the copied indicium. In either case, the original and copied indicia are distinguishable. A forensic verifier system will make this distinction as described herein.

A manual forensic detection system can be simply a visible light source and an ultraviolet source with a switch that can switch between the two sources. An operator can view the indicium under the two light sources and verify the fluorescence of the image and the non-fluorescence of the background under ultraviolet illumination.

An automatic forensic verifier system 400 will similarly include two light sources and two image memories for the image under each illumination source. The first light source 404 is a long wavelength light source, such as a visible or infrared source used for reading the indicium data. Preferably, the spectrum of visible light source is concentrated in a region of the spectrum where the machine-readable fluorescent ink has high optical density. The second light source 406 excites the indicium fluorescence with a shorter wavelength source such as ultraviolet light. When scanning security marking a switch mechanism 408 alternates the light source between the visible and ultraviolet sources. The forensic verifier collects a visible image with the reflected image scanner 412 and stores it in the verifier memory at 414. The forensic verifier collects an image of the fluorescent emissions with a fluorescent image scanner 410 and stores it in another region of the forensic verifier memory at 416. The fluorescent image scanner 410 and the reflected image scanner 412 may be the same physical device, or may be separate devices designed to optimize collection of the corresponding image. The forensic verifier uses an image correlator 418 to compare the images of the indicium saved in memory at 414 and 416. An image correlator 418 measures the correlation between the image optical density under visible light with the fluorescent image under ultraviolet illumination. A threshold is set to provide an alarm if the fluorescence is too low or non existent or if the fluorescent image is not correlated properly with the visible image.

When an original indicium is illuminated with visible light, the image is dark against the bright background of the paper. When the original indicium image is illuminated with the ultraviolet light source, the indicium image is bright against the low fluorescence background of the paper. Similarly, a copied indicium illuminated with visible light appears dark against a light background. Contrary to the properties of an image of an original indicium under ultraviolet illumination, a copied indicium printed on a fluorescent background or overprinted with fluorescent material and illuminated with ultraviolet light will show a dark image against the bright fluorescent background.

FIG. 4 shows a reflection spectra for example black and red inks superimposed on the spectral factor of an orthochromatic filter. FIG. 4 shows percent reflectance of red 504 and black 506 ink versus wavelength in nanometers and a normalized sensitivity factor 502 for the scanner. There is an advantage of black ink over red ink for machine readability. The relevant values of ink and paper reflectance are obtained by averaging the respective reflectance spectra 504 and 506 weighted by the spectral factor of the scanning system 502. Line 510 illustrates characteristics with a red filter. The spectral factor is the normalized product of the illuminant spectrum, the spectral response of the image capture device and the spectral characteristics of the associated optical filters. The resulting averaged reflectance of the black ink is R=0.11 and the reflectance of the red ink is R=0.31 in the green region. If the reading is done in the red region of the spectra, the red ink is invisible (R~0.8). Examination of the relationship between the scanner spectral factor and the reflectance spectra of the red ink reveals an overlap spectral region where both the scanner spectral factor and the ink reflectance are substantial. The scanner therefore detects a significant reflection from the red ink. The black ink reflectance is low where the scanner spectral factor is high, and thus the scanner will detect low reflectance of the black ink.

Figure 5A:
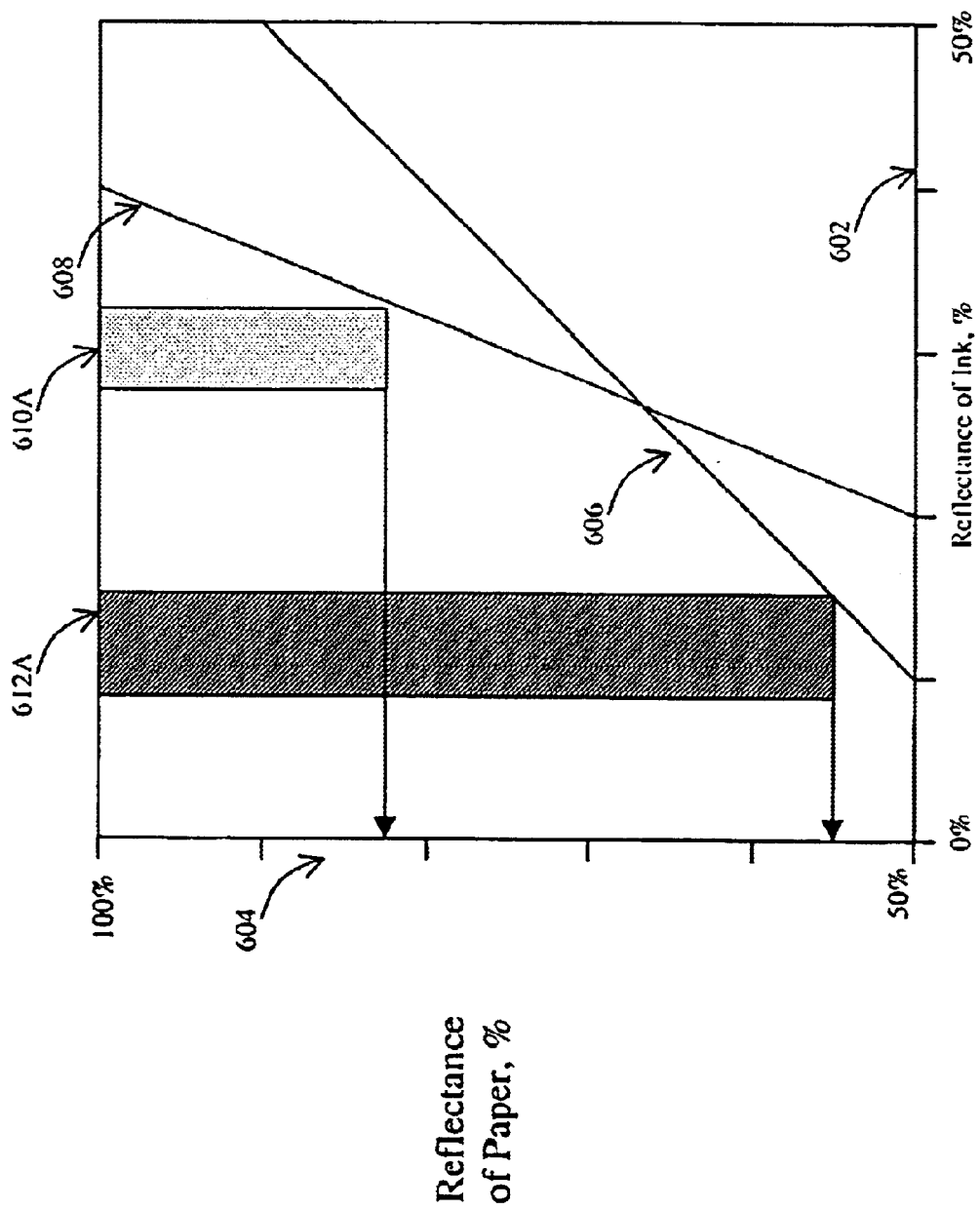
FIG. 5A is a graph illustrating the range of black and red ink reflectivity with a typical machine vision system using a green filter.
Figure 5B:
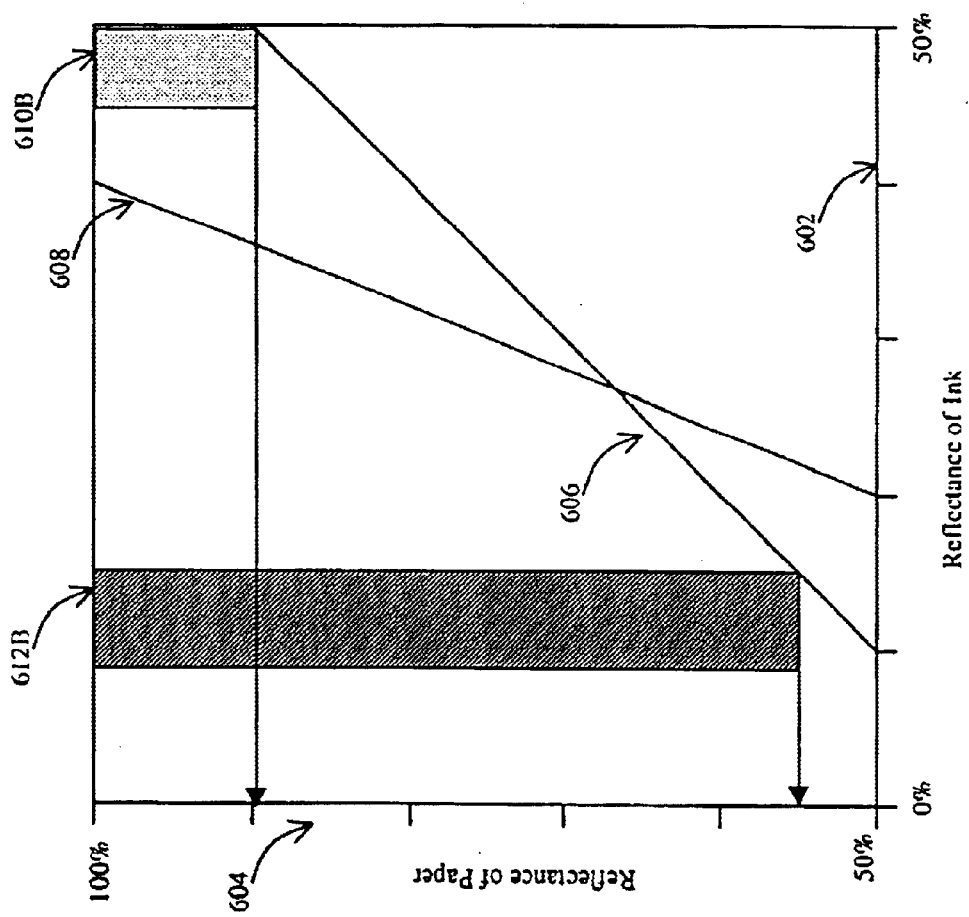
FIG. 5B is a graph illustrating the range of black and red ink reflectivity with a typical machine vision system using a red filter.

FIGS. 5A and 5B show the range of ink reflectivity that provides readability for red and black inks by superimposing the spectra on the spectral factor of an orthochromic filter and shows the superiority of machine readability for a black ink. FIG. 5A is a graph showing percent reflectance for black and red ink contrast seen with a green filter. This figure shows the region of ink and paper reflectivity which enables machine-readability in a particular case, i.e., to the left of both 608 and 606. Paper reflectivity is on the vertical axis and ink reflectivity is on the horizontal axis. In order to achieve a high read-rate with typical machine-reading systems ink and paper optical reflectance should satisfy two requirements. The difference between the paper reflectance 604 and ink reflectance 602 is the Print Reflectance Difference (PRD). For reliable scanning operation the PRD has to be higher than a minimum value which is typically equal to 0.3 as required by the DMM (USPS Domestic Mail Manual). The acceptable region is thus above and to the left of the line 608. Machine reading systems often automatically adjust the threshold for binarization of the image as a percentage of the substrate reflectance. The ratio of the PRD and the substrate reflectance is the Print Contrast Signal (PCS). For efficient thresholding and decoding, the PCS has to be higher than a minimum value which is typically 0.5 for most decoding algorithms used in automatic identification and data capture systems. Thus the acceptable region must also be above and to the left of the line 606. The example red and black ink reflectance areas, represented by 610A and 612A, respectively, are both within the acceptable range for this filter. For FIG. 5B, on the other hand, is a graph showing percent reflectance for black and red ink contrast seen with a red filter. Here, area 610B, red reflectance, is to the right of line 608—showing poor contrast.

FIGS. 5A and 5B exemplify those conditions where the range of permissible paper reflectance is shown in the shaded area for black inks at 612 and for red inks at 610. With a scanner as defined above, black inks reflectance values range typically from 0.1 to 0.15 or Optical Density (OD) in the range 0.8<OD<1.0, while red inks reflectance values range higher, typically from 0.275 to 0.325 (0.5<OD<0.55. The net result is that a large range of paper reflectance (R.paper>0.55) can be used with black inks, while paper reflectance is limited to (R.paper>0.80) for red inks. In other words red inks restrict the background of the paper to white only, while with black inks, off-white, gray and manila paper are permissible.

FIG. 6 is a schematic illustration summarizing the direct fluorescence process in one type of homogeneous ink of the invention. Again, note FIG. 6 illustrates this process with a particular red dye, Sulphorhodamine B (SRB) as part of the first colorant. The absorption of the excitation energy at 254 nm by the SRB results in a higher excited state of the SRB, which rapidly internally converts to its lowest excited singlet ($S_1$) state, and then fluoresces from this. The whole process occurs within the SRB molecule and thus the other dyes present in the formulation play no role in energy transfer, other than to act as potential quenchers.

FIG. 7 is a schematic illustration summarizing the cascade energy transfer fluorescence process in another type of homogeneous ink of the invention. In FIG. 7, the absorption of the excitation energy at 254 nm occurs by sensitization (energy transfer) by a particular yellow dye, Coumarin sulphonic acid, with green fluorescence. This could cascade energy transfer to the $S_1$ state of the SRB, followed by fluorescence from SRB. In this situation it is important that the Coumarin sulfonic acid, or the other yellow dye, have high fluorescence efficiency, and that its emission band overlaps well with the absorption band of the SRB.

Figure 8:
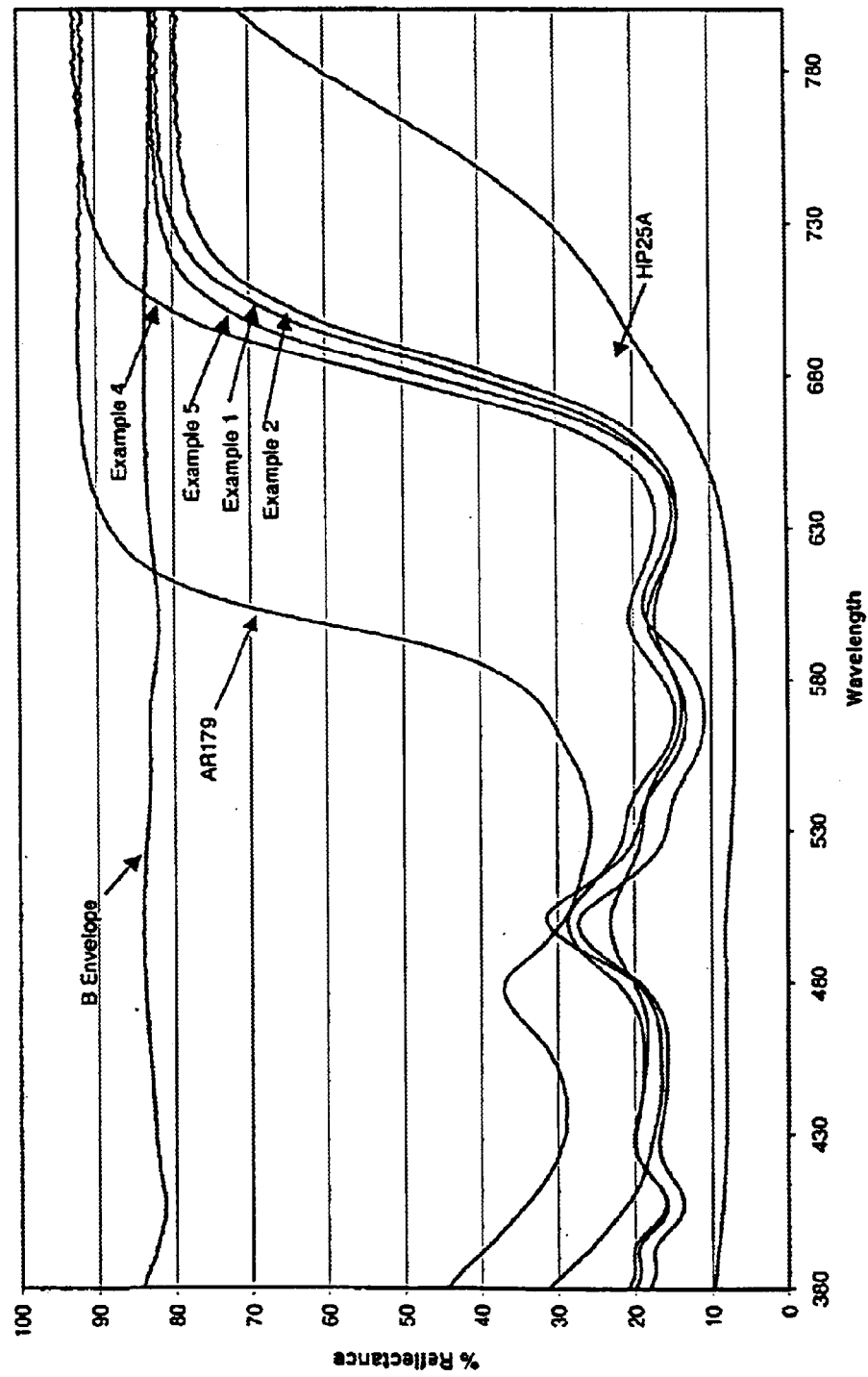
FIG. 8 is a graph of reflectance spectra for various homogeneous inks.

FIG. 8 is a graph of reflectance spectra for various homogeneous inks. The reflectance spectra of the example inks is compared to red postage meter ink jet ink AR179.

Figure 9A:
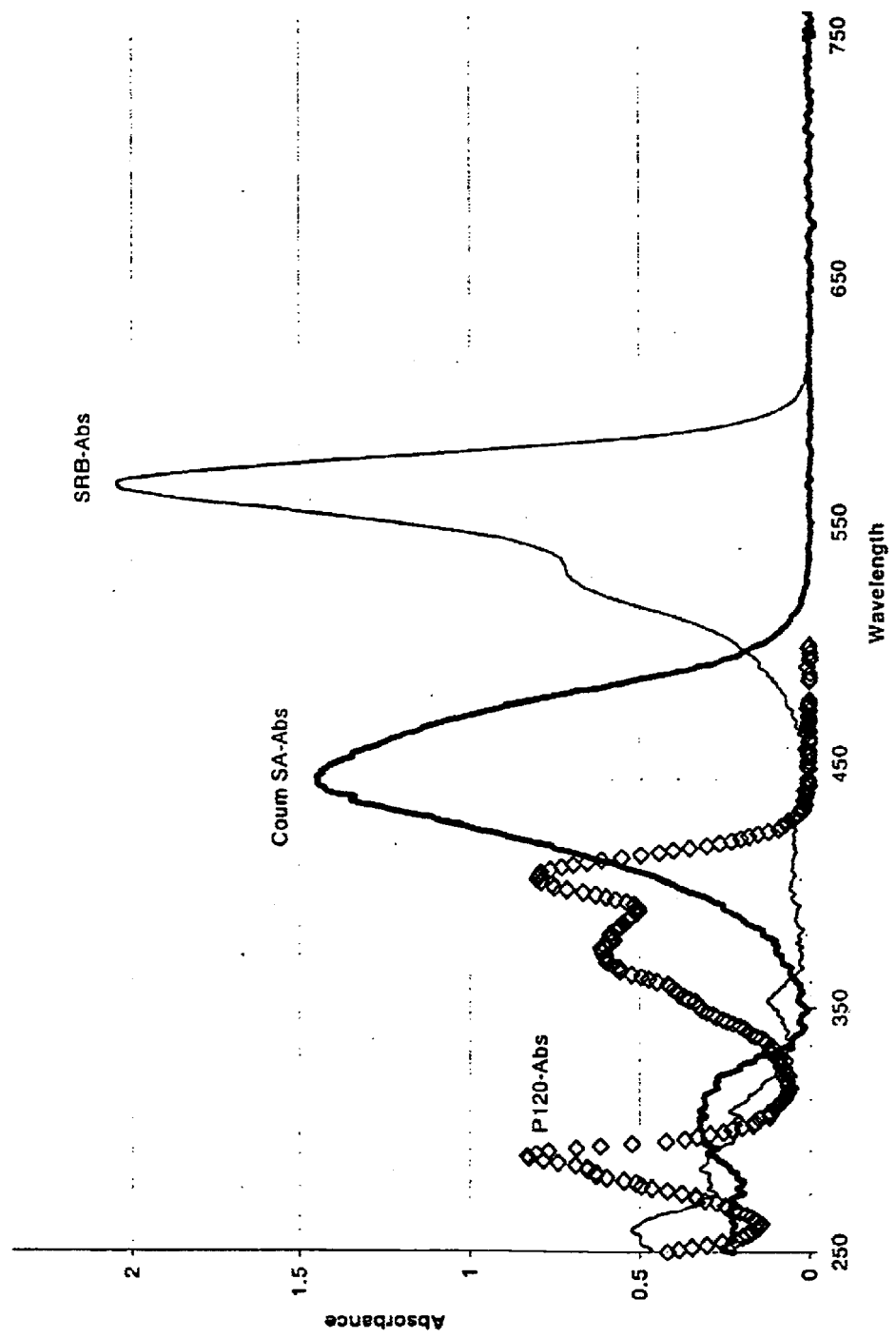
FIG. 9A is a graph of the absorbance spectra of various dyes used in producing homogeneous inks.

FIG. 9A is a graph of the absorbance spectra of dyes used in producing homogeneous inks. It should be noted that the energy transfer from the coumarin to the SRB shown in FIG. 7 is not 100% efficient and thus fluorescence from the coumarin can still be seen (and detected spectrophotometrically) from the ink layer.

Figure 9B:
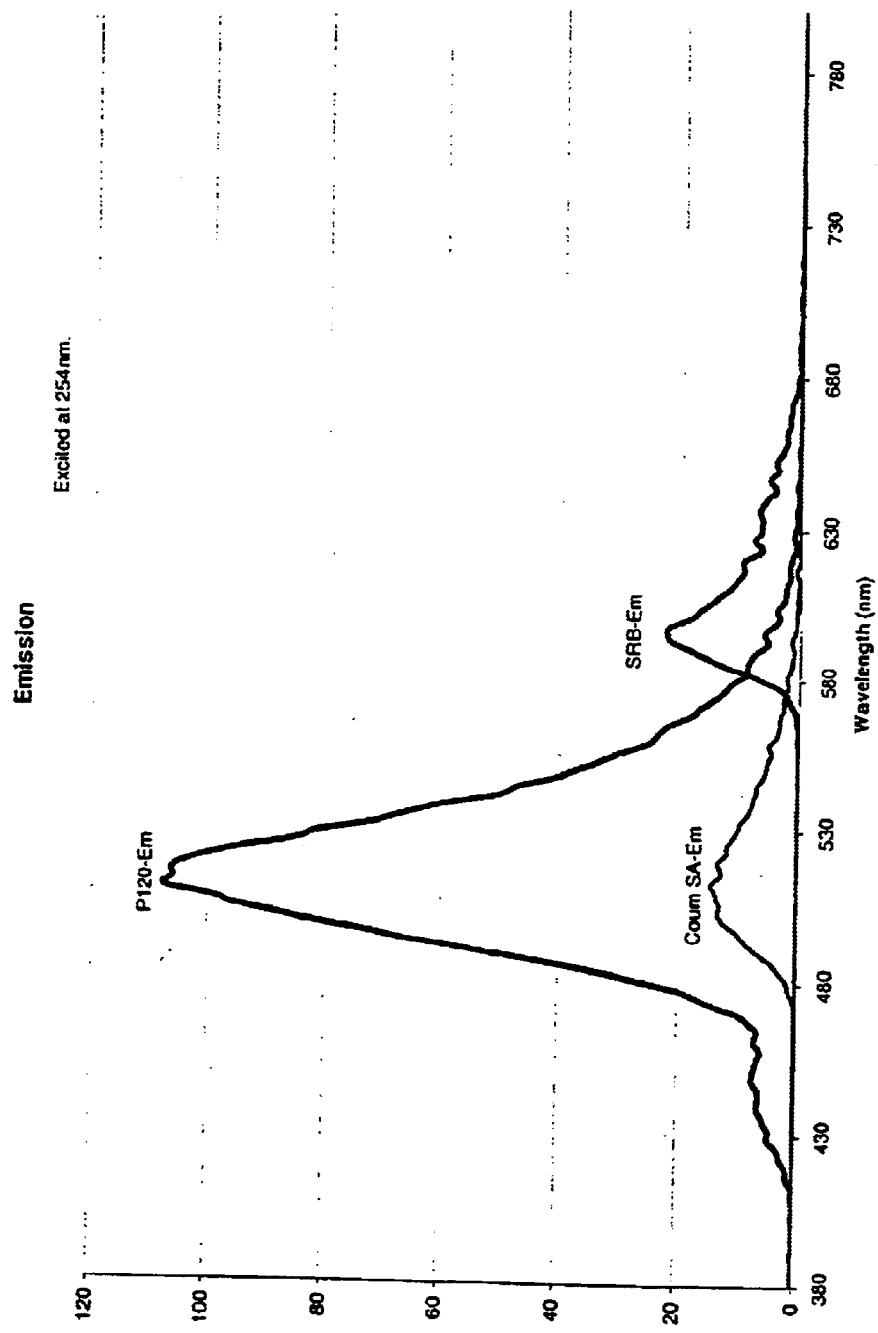
FIG. 9B is a graph of the emission spectra of various dyes used in producing homogeneous inks.

FIG. 9B is a graph of the emission spectra of dyes used in the example homogeneous inks.

Figure 10:
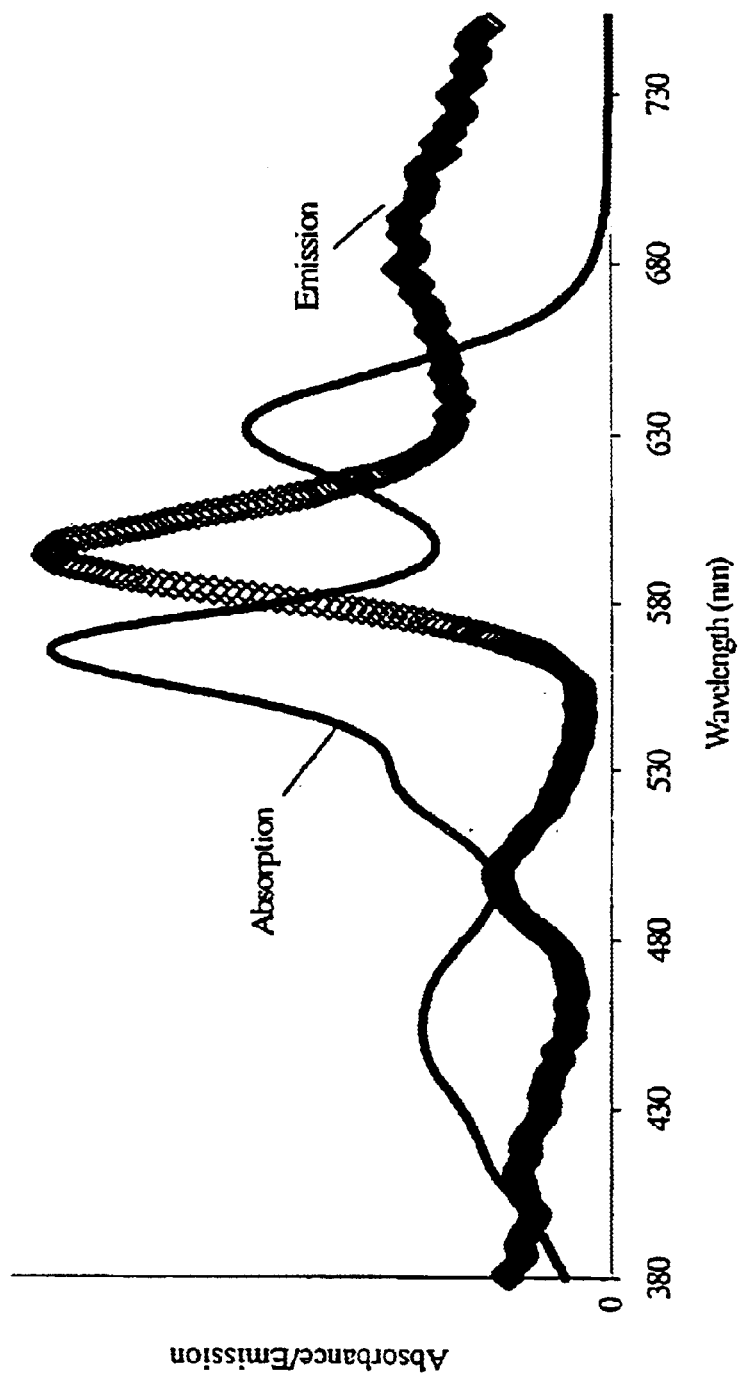
FIG. 10 is a graph showing the interaction between the emission and absorption spectra of various dyes used in producing homogeneous inks.

FIG. 10 is a graph showing the relation between the emission and absorption spectra of dyes used in producing homogeneous inks. FIG. 10 shows the spectral window of the black mixture that allows uninhibited emission of the red-fluorescence.

FIG. 11A is a table of reflectance and fluorescence properties of a drawdown of example homogeneous inks compared with traditional meter ink.

FIG. 11B is a table of reflectance and fluorescence properties of high-resolution meter imprints of example homogeneous inks on white envelopes compared with traditional meter ink.

FIG. 11C is a table of reflectance and fluorescence properties of high resolution meter imprints of example homogeneous inks on kraft envelopes compared with traditional meter ink.

FIG. 12 is a table of physical properties of example homogeneous inks.

The inks described herein and illustrated in the examples presented below comprise water-based homogeneous photosensitive optically variable ink compositions. The inks of the invention should have a visual dark color (neutral black), e.g., with L, a, b values in the range of L=(<57), a=(−5 to 5), b=(−5 to 5) and preferably in the range of L=(,55), a=(−1 to 1), b=(−1 to 1) and a red-fluorescent signal when excited with UV light short or long wavelength. The print contrast signal PCS (also, PCR) is preferably greater than 0.35, for white and kraft papers with the red or green filters, when measured with the Envelope Reflectance Meter from the USPS. For white paper with red filter, values of greater than 0.45 are desired, e.g., 0.48 and above, e.g., 0.48–0.6, and essentially the same values with a green filter. For kraft paper, it is preferably greater than 0.35, e.g., 0.37–0.5 for a green filter and 0.45 and above, e.g., 0.43–0.6, with a red filter.

The PRD is preferably greater than 0.25 for white and kraft paper with the red and green filters. For white paper with a red filter, it can be 0.60 and above and 0.55 and above for a green filter. For kraft paper with a red filter, it can be 0.30 and above and 0.25 and above for a green filter. The optical density of the visible component is therefore high enough to allow automatic scanning using an OCR scanner or the like. The fluorescent component is suitable for use by the facing equipment to orient the mail and, preferably, to discriminate from green phosphorescent stamps. The emissions are in the wavelength range of 580–640 nm when excited by UV light. The fluorescent intensity should be at least 7 PMU and for examples is in the range of (39–69) Phosphor Meter Unit (PMU) for solid printed areas and 50 to 98 PMU for drawdowns, the fluorescent component can be carried by the solvent (carrier) into the substrate and provide adequate fluorescent signal intensity.

In preferred forms, and when viewed from a variety of perspectives, the colorants can be selected such that the net effect between fluorescence and quenching by the other components that when dry: after a draw down on white envelope substrate exhibits a fluorescent intensity of 50 to 99+ PMU; after a postage meter imprint is produced with a resolution of 160×480 dots per inch of a solid area on white envelope substrate exhibits a fluorescent intensity of 39 to 69 PMU; after a high resolution printer produces a solid area with a resolution of 1440×720 dots per inch of a solid area on white envelope substrate exhibits a fluorescent intensity of 19 to 39 PMU; after a high resolution printer produces a solid area with a resolution of 1440×720 dots per inch of a solid area on kraft paper substrate exhibits a fluorescent intensity of 19 to 32 PMU; dry after a high resolution printer produces a solid area with a resolution of 1440×720 dots per inch of a solid area on white envelope substrate exhibits a fluorescent w Fluoromax-2 Fluorescent Spectrophotometer of 96,482 to 232,643 counts per second; and after a high resolution printer produces a solid area with a resolution of 1440×720 dots per inch on kraft envelope substrate exhibits fluorescent intensity when measured with a Fluoromax-2 Fluorescent Spectrophotometer of 106,576 to 242,180 counts per second.

If we consider a typical formulation containing a dye that emits red fluorescence and a blue, non-fluorescent dye, the major problem is the inevitable overlap between the fluorescence emission band of the red-emitting dye and the absorption band of the blue dye. This means that there is a strong probability that energy transfer will occur from the excited state of the red-emitting dye to the ground state of the blue dye, resulting in quenching of the red fluorescence.

Therefore, a reasonable explanation that would account for this phenomenon is that the blue must be physically separated in some way from the fluorescing species, thus preventing energy transfer taking place. If this is the case, then the polymeric side chains on the dye that are believed responsible for this separation. The steric shielding and especially the radius of the quencher molecule can be an effective barrier to quenching.

It is known that resonance energy transfer can take place between molecules over considerable distances at the molecular level. A distance of ca. 50 Angstroms or higher would ensure that the efficiency of energy transfer between a red-emitting dye and a blue dye would be less than 20%, which would be sufficiently low to still permit the ink to exhibit strong red fluorescence. In the case of polymeric dyes, like Milliken Blue X3 and related dyes, the radius of the polymeric dyes can vary between ca. 20 and 250 Angstroms, or even higher in some cases. In addition, it is possible that such dyes (which are liquids at room temperature) could phase separate as microscopic droplets in the dried ink layer, and this would also give effective physical separation of the blue dye from the other dyes. Another important characteristic of the blue dye is that its extinction coefficient should be as high as possible so that it may be used at low molar concentrations and still provide an intense black color. In general the extinction coefficient $\epsilon$ should ideally (but not essentially) be higher than 10000 $IM^{-1}$ $cm^{-1}$.

Preferred yellow or orange fluorescent dye components (FY) may be based on the chromophoric systems such as anionic coumarins, cationic coumarins, anionic naphthalimide dyes, pyranine (anionic pyrene dye), neutral, anionic and cationic perylene dyes, and anionic xanthene dyes. FIG. 13 illustrates some preferred yellow or orange fluorescent dyes.

Preferred red or purple fluorescent dye components (FR) are, for example, rhodamines, bispyrromethane boron complexes, or pyronines. FIG. 14 illustrates some preferred red or purple fluorescent dyes.

Figure 15:
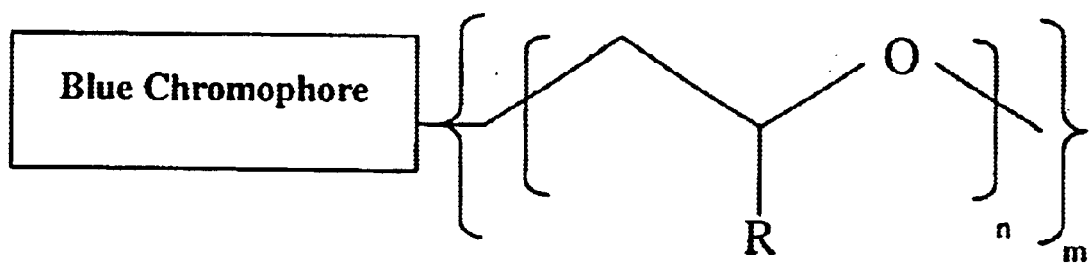

Polymeric blue dyes (PB) can very generally be defined as in FIG. 15 wherein a the represented blue chromophore has a polymeric chain represented by the moiety in brackets, { }, where R is Me or H; n is a number from 5 to 20; and m is a number from 1 to 6. The formula represents a structure wherein one or more linear or branched polymer chains that are attached to the blue dye chromophore. Such polymer chains should be sufficiently hydrophilic to confer water solubility on the dye, and sufficiently large to provide a dye molecule with a radius of at least about 20, but preferably between 100–500 Angstrom units, thus providing the requisite spacing between the red-emitter molecules and the blue dye molecules to minimize quenching of the former by the latter. These would include poly(ethylene oxide), poly(ethylene oxide)/poly(propylene oxide) copolymeric chains, polysaccharide residues, polyvinyl alcohol, polyacrylic acid, and polyacrylamide copolymers, poly(tetrahydrofuran) derivatives.

The blue dye chromophore may be any system absorbing intensely between 650 and 700 nm, with low absorption between 550 and 620 nm. This would include 1,4-diaminoanthraquinones, metal and metal-free phthalocyanines, squarylium dyes, cyanine dyes, triarylmethane dyes, 4,8-diamino-1,5-naphthoquinones.

Note that the PB-TPM1 amino side chains are co-polymeric poly(ethylene oxide-propylene oxide) residues.

The ink carrier for the colorants used in these ink compositions contain at least 65% water. The other important solvents/additives categories are as following:

Fluorescence stabilizers (FS) which are additives for maintaining (sometimes by enhancing fluorescence) the constant fluorescence level. Since the fluorescence of low viscosity inks that do not contain pigments decreases as the ink penetrates the paper there is a real need for an additive that will help maintain a constant level of fluorescence. The following solvents were found to provide a considerable enhancement of fluorescence:

N,N-Dimethylacetamide

Sulfolane

Formamide

Methylphenyl sulfoxide

N-Methylpyrrolidinone

4-Methylmorpholine-N-oxide (MMNO)

DMSO (Dimethylsulfoxide)

All these solvents have the characteristic of a dipolar aprotic solvent with a high dielectric constant (>ca. 20) or high value of Hildebrand solubility parameter ($\delta>10$ MPa$^{1/2}$).

From this list the 4 methylmorpholine-N-oxide (MMNO) had the best ability to achieve long term increased fluorescence, has no fluorescence quenching tendency and is a hygroscopic high boiling solid when pure. (It is usually supplied as 50–60% aqueous solution.) The MMNO is a known solvent for cellulose and aids penetration into the fibers of the paper, which may increase the fluorescence in a selective and long lasting manner.

Polar low molecular weight resins (PLMWR) are of benefit to enhance and stabilize the fluorescence, in many cases to a lesser extent and by a different mechanism that the FS materials described above. Polar resins such as polyvinylpyrrolidone (MW 15000) and polyethyleneglycols are beneficial. Other water-soluble resins with good solvent characteristics for polar dyes are: polyvinylalcohol, poly N,N-dimethylhydantoin, polyacrylates, etc.

Since the mixtures of polymeric colorants and single dyes do not always form molecular solution and the polymeric dyes may drop out of solution (separate droplets may be seen) surfactants (S) with strong solubilizers effects have to be added. A special efficient category of surfactants for use with anionic dyes is the long chain anionic surfactants of which an example is the dodecylbenzenesulphonic acid, sodium salt.

Glycol ethers (GE) such as BTG (Triethylene Glycol Mono Butyl Ether). The glycolether have multiple beneficial effects such as: bridging between the water and other organic solvents, enhancing the color and fluorescence by internal hydrogen bonding, and improved penetration into the paper. The most efficient glycol was the BTG. Among suitable glycols that could be used are as following:

1. Triethylene glycol n-Butyl Ether (BTG)
2. Tripropylene Glycol Methyl Ether (TPM)
3. Diethylene Glycol n-Butyl Ether (DB)
4. Diethylene Glycol Methyl Ether (DM)
5. Dipropylene Glycol Methyl Ether (DPM)

Amines (A) such as Triethanol amine, ethanol amine, diethanolamine, trisopropanolamine, butyldiethanolamine, N,N dimethylethanolamine, N,N diethylethanolamine, N,N dipropylethanolamine, etc. The role of the organic amines are in preventing the aggregation of the dyes, the evaporation during drying as a fugitive counterion and thus providing improved waterfastness as well as for improved solubility in water/glycol/ether mixtures. The amine helps also in maintaining constant viscosity during long periods of rest as well as fluidity and easy redispersibility. In addition does not cause clogging of nozzles during printing or at the time of restarting after interruption of printing, thus maintaining high ejection stability.

The following are examples of formulations based on the previously described concepts, methods of making and evaluation methods and results.

The ink formulations of the present invention were obtained by addition of the highest percentage component by weight (of stock solutions prepared from all components in water till completely dissolved into a container and then subsequent additions of the largest percent by weight component until all the components were added to a mixing container. The ink was vacuum filtered through a 5-micron polyvinylidene fluoride membrane filter from Millipore to remove any large solids prior to printing.

EXAMPLE 1

This example illustrates the preparation of an ink composition of the present invention comprising a blue polymeric dye, yellow and red fluorescent dyes, a surfactant, a clear polymer resin, a polar solvent and a pH adjuster. The following components were combined and mixed using a magnetic stirrer until a homogenous ink composition was obtained.

| COMPONENT | EXAMPLE 1 | (wt. %) |
| --- | --- | --- |
| Coumarin 7 sulphonic acid | (YD) | 0.410 |
| Sulforhodamine B | (RD) | 0.470 |
| Dodecylbenzene sulphonic acid | (S) | 0.920 |
| Millijet Blue 28 | (BD) | 2.800 |
| 4-Methylmorpholine N-oxide | (FS) | 8.020 |
| Polyvinylpyrrolidone(K-12) | (PLMWR) | 8.690 |

-continued

| COMPONENT | EXAMPLE 1 | (wt. %) |
|---|---|---|
| Triethanolamine | (A) | 0.120 |
| Distilled H2O | | 78.57 |
| Total | | 100.000 |

EXAMPLE 2

This example illustrates the preparation of an ink composition of the present invention comprising a blue polymeric dye, yellow and red fluorescent dyes, a surfactant, a clear polymer resin, a polar solvent, a penetrant and a pH adjuster. The following components were combined and mixed using a magnetic stirrer until a homogenous ink composition was obtained.

| COMPONENT | EXAMPLE 2 | (wt. %) |
|---|---|---|
| Coumarin 7 sulphonic acid | (YD) | 0.390 |
| Sulforhodamine B | (RD) | 0.820 |
| Dodecylbenzene sulphonic acid | (S) | 1.030 |
| Pyranine 120 | (YD) | 1.030 |
| Millijet Blue 28 | (BD) | 2.080 |
| 4-Methylmorpholine N-oxide | (FS) | 2.980 |
| Polyvinylpyrrolidone (K-12) | (PLMWR) | 3.230 |
| Triethylene Glycol Mono Butyl Ether | (GE) | 5.110 |
| Triethanolamine | (A) | 0.160 |
| Distilled H2O | | 83.17 |
| Total | | 100.000 |

EXAMPLE 3

This example illustrates the preparation of an ink composition of the present invention comprising a water fast blue polymeric dye, yellow and red fluorescent dyes, a surfactant, a clear polymer resin, a polar solvent, a penetrant and a pH adjuster. The following components were combined and mixed using a magnetic stirrer until a homogenous ink composition was obtained.

| COMPONENT | EXAMPLE 3 | (wt. %) |
|---|---|---|
| Sulforhodamine B | (RD) | 0.050 |
| Coumarin 7 sulphonic acid | (YD) | 0.350 |
| Pyranine 120 | (YD) | 0.830 |
| Dodecylbenzene sulphonic acid | (S) | 0.830 |
| Triethanolamine | (A) | 0.870 |
| 4-Methylmorpholine N-oxide | (FS) | 2.180 |
| Triethylene Glycol Mono Butyl Ether | (GE) | 2.780 |
| Millijet Blue 18 | (BD) | 3.470 |
| Polyvinylpyrrolidone(K-12) | (PLMWR) | 5.480 |
| Distilled H2O | | 83.16 |
| Total | | 100.000 |

EXAMPLE 4

This example illustrates the preparation of an ink composition of the present invention comprising a blue polymeric dye, a black polymeric dye, yellow and red fluorescent dyes, a surfactant, a clear polymer resin, a polar solvent, a penetrant and a pH adjuster. The following components were combined and mixed using a magnetic stirrer until a homogenous ink composition was obtained.

| COMPONENT | EXAMPLE 4 | (wt. %) |
|---|---|---|
| Coumarin 7 sulphonic acid | (YD) | 0.350 |
| Acid Red 52 | (RD) | 0.410 |
| Dodecylbenzene sulphonic acid | (S) | 1.100 |
| Pyranine 120 | (YD) | 1.320 |
| Millijet Black 2000 | (BD) | 1.340 |
| Millijet Blue 28 | (BD) | 1.780 |
| 4-Methylmorpholine N-oxide | (FS) | 2.540 |
| Polyvinylpyrrolidone (K-12) | (LMWR) | 5.680 |
| Triethylene Glycol Mono Butyl Ether | (GE) | 13.41 |
| Triethanolamine | (A) | 0.050 |
| Distilled H2O | | 72.02 |
| Total | | 100.000 |

EXAMPLE 5

This example illustrates the preparation of an ink composition of the present invention comprising a water-fast blue polymeric dye, a black polymeric dye, yellow and red fluorescent dyes, a surfactant, a clear polymer resin, a polar solvent, a penetrant and a pH adjuster. The following components were combined and mixed using a magnetic stirrer until a homogenous ink composition was obtained.

| COMPONENT | EXAMPLE 5 | (wt. %) |
|---|---|---|
| Coumarin 7 sulphonic acid | (YD) | 0.230 |
| Acid Red 52 | (RD) | 0.320 |
| Pyranine 120 | (YD) | 1.110 |
| Dodecylbenzene sulphonic acid | (S) | 1.120 |
| Millijet Black 2000 | (BD) | 2.210 |
| 4-Methylmorpholine N-oxide | (FS) | 2.520 |
| Millijet Blue 18 | (BD) | 3.080 |
| Polyvinylpyrrolidone (K-12) | (PLMWR) | 4.090 |
| Triethylene Glycol Mono Butyl Ether | (GE) | 8.710 |
| Triethanolamine | (A) | 0.040 |
| Distilled H2O | | 76.57 |
| Total | | 100.000 |

EXAMPLE 6

This example illustrates the preparation of an ink composition of the present invention comprising a blue polymeric dye, a black polymeric dye, yellow and red fluorescent dyes, a surfactant, a clear polymer resin, a polar solvent, a penetrant and a pH adjuster. The following components were combined and mixed using a magnetic stirrer until a homogenous ink composition was obtained.

| COMPONENT | EXAMPLE 6 | (wt. %) |
|---|---|---|
| Acid Yellow 7 | (YD) | 0.220 |
| Acid Red 52 | (RD) | 0.420 |
| Dodecylbenzene sulphonic acid | (S) | 1.180 |
| Pyranine 120 | (YD) | 1.400 |
| Millijet Black 2000 | (BD) | 1.930 |
| 4-Methylmorpholine N-oxide | (FS) | 2.52 |
| Millijet Blue 18 | (BD) | 3.080 |
| — | (BD) | 2.730 |
| Triethylene Glycol Mono Butyl Ether | (GE) | 4.640 |
| Polyvinylpyrrolidone (K-12) | (PLMWR) | 5.990 |

-continued

| COMPONENT | EXAMPLE 6 | (wt. %) |
|---|---|---|
| Triethanolamine | (A) | 0.110 |
| Distilled H2O | | 78.77 |
| Total | | 100.000 |

The drawdown equipment required included a wire wound rod #1 (Yellow Handle—0.08 mm wire diameter), KCC101 Coater or similar drawdown apparatus, Printmaster No. 10 White Wove envelopes supplied by Old Colony or equivalent, Pasteur pipettes or eyedroppers and cellophane tape. A drawdown of the ink sample was prepared by cutting several envelopes into 2×11 inch strips then securing the paper samples on KCC101 units surface. A setting bar was then used as described in KCC101 manual to create even pressure across the KCC101 surface. The yellow handled wire wound bar #1 was then placed in the unit. A 1.5" long piece of cellophane tape was placed across the paper strip below and parallel to wire wound rod. The test ink sample is then distributed evenly across cellophane tape. The speed of the KCC101 was then set to setting #10 12 m/min) and the drawdown motor switch moved to the forward position. The drawdown samples are removed and allowed to dry for 24 hours before taking measurements.

The optical density of the drawdown and prints were measured by using a X-Rite densitometer with an orthochromatic filter. Several strips of the white wove envelope were used under the drawdown to insure that the background is consistent and does not affect the measurements. Five different areas were sampled and the results averaged.

The inks of the present invention were evaluated for liquid properties such as viscosity, surface tension and pH. Physical properties such as reflectance at various wavelengths and fluorescence were also examined initially for ink drawdowns and also printed samples with commercial ink jet printers. The data collected utilizing test procedures outlined below and is presented in Tables set out in FIGS. 11A through 11D. The tables set out in FIGS. 11A through 11D represent properties of a red postage meter ink jet ink as a control and all the previously stated ink jet ink Examples 1 to 6. The information in FIG. 11A was obtained from measurements made of KCC101 Coater drawdowns as described in the procedure section. FIG. 11B contains data of all the inks printed with an HP Deskjet 1600C at 600×300 DPI on the same white wove envelopes used in FIG. 11A. FIG. 11C contains similar data as FIG. 11B, except the high resolution prints were made on Kraft Envelopes instead of the Printmaster White Wove envelopes.

Evaluation of Example Inks and Paper Interaction Properties:

Drawdown Preparation:

The equipment required included the following; a wire wound rod #1 (Yellow Handle—0.08 mm wire diameter), KCC101 Coater or similar drawdown apparatus, Printmaster No.10 White Wove envelopes supplied by Old Colony or equivalent, Pasteur pipettes or eyedroppers and Cellophane Tape. A drawdown of the ink sample was prepared by cutting several envelopes into 2×11 inch strips then securing the paper samples on KCC101 units surface. A setting bar was then used as described in KCC101 manual to create even pressure across the KCC101 surface. The yellow handled wire wound bar #1 was then placed in the unit. A 1.5" long piece of cellophane tape was placed across the paper strip below and parallel to wire wound rod. The test ink sample is then distributed evenly across cellophane tape. The speed of the KCC101 was then set to setting #10 (12 m/min) and the drawdown motor switch moved to the forward position. The drawdown samples are removed and allowed to dry for 24 hours before taking measurements.

Evaluation 1: Optical Density

The optical density of the drawdowns and prints were measured by using a X-Rite densitometer with an orthochromatic filter. Several strips of the white wove envelope were used under the drawdown to insure that the background is consistent and does not affect the measurements. Five different areas were sampled and the results averaged.

Evaluation 2: Color

The color was measured using Bispectral Fluorescence Colorimeter (BFC-450) from Labsphere Inc. This colorimeter has an advantage of the ability to separate the fluorescent and reflected components of the light emitted from the sample thus calculating the true color parameters of the fluorescent object. The instruments unique dual monochromator design measures the reflectance and fluorescence every 10 nm. The resulting bispectral matrix is then used to calculate the sample's total radiance factor providing a complete and illuminant independent colorimetric characterization of a sample. Ink drawdowns and printed samples were placed in the sample holder and the reflectance and fluorescence measured from 380 nm to 780 nm. The instrument has 45°/0° reflectance geometry and the results presented are using D65 illumination at a 10° standard observer according to CIE (International Commission on Illumination) standards established in 1964. The L value is a measure of light and dark, while the a and b values are a measure of the color. Neutral color would be represented by a=0 and b=0, with the color shifting from gray to black as the L value decreases.

Evaluation 3: Fluorescence (PMU)

The fluorescence intensity of the drawdowns and prints were measured using a U.S.P.S. supplied LM-2C Luminescence Meter. The LM-2C measures fluorescence as a result of excitation with a pulsed short wavelength ultraviolet lamp (254 nm). The relative strength of the emission is displayed in Phosphor Meter Units (PMU). The PMU displayed is proportional to the energy collected by the detectors through a 5.2 $cm^2$ aperture window, a PMU reading of 15 is considered acceptable for postal sorting operations. The unit has a portable standard plate containing a 3.2 cm diameter circular red fluorescent wafer for calibration purposes. The plate with the wafer is placed onto the unit with the circular wafer completely encompassing the read window. The wafer has a specific red fluorescent intensity value near the mid range of 61 PMU for this particular test unit and a full scale reading of 99PMU. Each PMU unit has it's own calibration plate but all red fluorescent wafers are in the range of 59 to 65 PMU. The instrument can be manually adjusted to meet the wafer value.

The 15 PMU imprint value is dependent upon the intensity of the fluorescent material contained in the ink, type of envelope paper, graphic design of the printing elements such as 2-D bar code, indicia, postage values, date, but most critical is the total solid area which is captured through the unit's window. the larger the total solid area, the greater the PMU value. The LM-2C is designed with internal filters so that only specific emission wavelengths are allowed to reach the detectors (560 nm–660 nm). The ink drawdown samples examined completely covered the aperture window, while the solid area measured in the postage meter imprints were 1.9 cm×1.6 cm (3.04 $cm^2$) or 58.5% of the total window area. The DataMatrix in the high-resolution prints had a printed area of 1.144 cm² or a 22% fill of the window. The PMU meter has a maximum reading of 99 PMU. For any samples that read greater then 99 the area of the PMU meter window was made smaller until a value could be obtained. This value was then linearly extrapolated to the full PMU window scale. Five readings were obtained for each sample and the results averaged.

Evaluation 4: Fluorescence (Spectrophotometer)

Alternately, the fluorescence was measured by using a fluorescence spectrophotometer such as the FluoroMax-2 from Spex. The spectrophotometer is calibrated by using a Xenon lamp scan and a water Raman scan. The Xenon lamp scan shows the spectral radiance of the excitation source through the excitation monochromator. The Xenon lamp has a distinct spectral output, with a maxima at 467 nm. The excitation monochromator is adjusted with the instrument supplied software to display the correct maxima. The emission monochromator is calibrated by measuring the Raman peak of water. Due to O—H stretching, a water sample when excited at 350 nm, will exhibit a peak at 397 nm. The emission monochromator is adjusted using the instrument supplied software so that the peak maxima is 397 nm. The fluorescent intensity is calibrated by using a red fluorescent standard supplied by Matech (Westlake Village, Calif.). This standard is made from europium doped microspheres, it is extremely stable and has a very characteristic fluorescent emission. Prior to measurements, the standard is checked for a sharp peak at 610 nm with an intensity of 270,000 cps. The instrument was set to an excitation of 254 nm and the slits set to 1 nm bandpass (0.235 mm slit width) for both the emissions and excitation monochromators. The drawdown or printed sample is then placed in the front face accessory and the sample compartment closed securely so that no stray light can enter the sample chamber. A 365 nm cut-on filter is placed in the emissions beam to prevent any $2^{nd}$ order diffracted excitation light from obscuring the true spectra. An emissions spectra is then obtained in the visible region from 400–800 nm. The Fluoromax-2 records the results in photon counts per second (cps) for each wavelength.

Evaluation 5: Print Reflectance Difference (PRD)/Print Contrast Ratio (PCR)

A U.S.P.S. specified Envelope Reflectance Meter (ERM) was used to measure various optical properties of the ink drawdowns. The ERM was calibrated using black and white reflectance standards supplied with the instrument. A sample is placed in the instrument, moving it to five different spots to obtain an average measure of the envelope background reflectance.

The same is followed for the ink drawdown. The instrument measures the reflected light through two different filters, a red filter centered at 610 nm, and a green filter centered at 530 nm. A toggle switch changes the display from one filter to the other. The displayed data contains the reflectance measured and two addition numbers, the print reflectance difference (PRD) and print contrast ratio (PCR). The PRD is the reflectance of the background minus the reflectance of the ink. The PCR is the PRD divided by the envelope background to give a contrast ratio.

Evaluation 6: Bar Code Contrast

A method to determine DataMatrix barcode contrast was measured as follows using white light illumination. A black and white Charge Couple Device (CCD) camera was mounted perpendicular to the table and set at a height as to give a optical resolution of 250 dpi. Two white fluorescent lights were set on either side of the table to give balanced lighting. Using Kodak gray scale cards of 18% reflectance and 90% reflectance the illumination and camera settings were calibrated. The cards encompassed the whole field of view of the camera. Using the software, a histogram of small random areas of the field of view were examined for a constant gray scale value. The lighting is balanced if all selected areas in the field of view give the same gray scale value. A 36 rows×36 columns datamatrix symbol with 18.75 mil element size was printed with the Personal Post Office meter at 160×480 resolution using the various inks for the postage meter imprints. A 40 rows×40 columns datamatrix symbol with a 16.7 mil element size was printed at 1440× 720 DPI with an Epson Stylus 760 printer for the high resolution contrast measurements. The symbol properties (contrast included) were then calculated according to Automatic Identification Manufacturing (AIM) specifications using Cimatrix software. A Metanetics hand held verifier (IV-2500) using red light emitting diodes (660 nm LED's) was also used to measure the contrast of the prints. Both the IV-2500 and the Cimatrix software obtain a grayscale image of the barcode and calculates the mean reflectance of the darkest 10% of the pixels and the mean reflectance of the lightest 10% of the pixels. The difference of the two means is defined as the symbol contrast.

Evaluation 7: Viscosity

The viscosity of the liquid inks were measured using a Haake VT550 Viscotester with a NV rotor and cup sensor system. The NV sensor system consists of a cup and a bell shaped rotor. It is classified as a coaxial cylinder sensor system with two gaps for sheering the samples on the inside and outside of the rotor. The procedure used to measure viscosity is as follows; A temperature control bath attached to the viscometer was set to 25 degrees C. and the test sample allowed to equilibrate in bath temperature for 10 minutes. The viscosity of test ink sample was measured using variable rotor speeds from 50 sec.$^{-1}$ to 3500 sec.$^{-1}$. This gives a stress-strain relationship from which the viscosity can be calculated by measuring the slope. The viscometer-supplied software provides the viscosity value.

Evaluation 8: pH

The pH of the liquid samples was measured using an Orion EA 920 pH Meter with a 8135BN flat surface electrode. The pH meter was calibrated with N.I.S.T. (National Institute of Standards and Technology) certified buffer solutions of pH 5, 7, and 10 before any measurements were recorded.

Evaluation 9: Surface Tension

The surface tension of the solutions was measured using the DuNouy method with a Fisher Surface Tensiomat with a platinum iridium ring. The instrument was calibrated by measuring the surface tension of pure water (American Chemical Society reagent grade) which was found to be in the range of 72 dynes/cm+0.5 dynes/cm at the room temperature of 25° C.

Evaluation 10: Aging/Stability

The stability/aging was assessed by measuring several different properties over time after placing the ink at an elevated temperature. Characteristics of the ink on paper were examined such as, optical density, fluorescence, and color. The liquid ink was observed as well for changes in viscosity, and signs of recrystallization or separation. The liquid inks were placed into a glass jars, tightly sealed with a cap and put into an oven at 60° C. The samples were removed from the oven after 24 hours and allowed to cool for 1 to ambient temperature before evaluation. The samples were tested for seven consecutive days. The observed properties were recorded and plotted versus time and any deviations from a straight line were noted. All the inks tested in the present invention were stable with only minor variations in the properties observed.

Evaluation 11: Reliability

The inks were installed in new Epson Stylus Color 760 printers and new Pitney Bowes Personal Post Office meters. After installing the inks a nozzle check pattern and 25 test prints were generated. The ink passed initial reliability if there were no nozzles out, as represented by missing lines in the test print. Over a two week time period. daily test prints were generated. If any nozzles failed to print, a print maintenance cycle on the printer was initiated and a test print generated to determine if the nozzles were completely blocked and unrecoverable. The ink would fail reliability testing if there were more than 3 unrecoverable nozzles. All the inks of the present invention were reliable over the two-week testing period.

The following table presents a glossary of various terms used in the above description for purposes of convenience and definition.

| | |
|---|---|
| Black | Absorbs the entire visible spectrum. |
| SROI | Scanning region of interest. This value depends on the task at hand and is predetermined for that task. For machine-readable images using a blue filter, the range is typically 440–600 nm, and for a red filter, typically 570–700 nm. For visual examination, the complete visual spectrum of from a bout 390–680 nm is of importance. |
| EPP | Emulsion polymerization process. |
| ERM | Envelope Reflectance Meter |
| FIM | Facing identifying mark is an orientation mark, usually printed near the edge of an envelope. |
| Fluorescence-exciting radiation | As used herein, the term "fluorescence-exciting radiation" refers to radiation of any wave length effective to cause a fluorescent material to fluoresce, and in the preferred cases is in the ultraviolet (UV) region of the spectrum, e.g., below about 390 nm. The source of ultraviolet light may be in the form of incoherent light or from a coherent source such as a laser. The fluorescent-exciting radiation can in addition to UV radiation be X-rays, electron beams, etc., as well as visible electromagnetic radiation of relatively short wavelength, such as green or blue light. |
| GE | Glycol ethers. |
| GH | Glycol humectants. |
| HPS | Highly polar solvents. |
| IBIP | Information-based indicia program. |
| Imagewise | In a defined pattern forming a predetermined image. |
| LMWP | Low molecular weight polymer. |
| NFRD | Non-fluorescent red dye. |
| NFYD | Non-fluorescent yellow dye. |
| OCR | Optical character recognition. |
| OD | Optical density. |
| OVD | Optically variable device. |
| PCS | Print Contrast Signal. The ratio between PRD and the background reflectance is called print contrast ratio (PCR) or print contrast signal (PCS). The PCS is a measure of the print quality and of the capability of the imaging software to detect and overcome print defects. A PCS of at least 80 percent in the SROI is needed while visually read inks require a PCS of 60 percent or higher. |
| PMU | Phosphor meter unit. |
| POV | Photosensitive optically variable. |
| PRD | Print Reflectance Difference. A scanner responds to a difference between light reflected from the printed indicia and the background. This difference is defined as print reflectance difference (PRD). A PRD of at least 40 percent in the SROI is necessary for reading indicia, while visually read inks require only a PRD of about 30 percent. |
| Red Fluorescent | Exhibits fluorescence in the red region of the spectrum, i.e., from 580 to 630 nm. |
| UV | Ultra violet radiation, e.g., about 390 nm and less. |

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A homogeneous aqueous ink capable of producing dark, machine-readable markings exhibiting fluorescence when exposed to fluorescent-exciting radiation, said ink being of suitable viscosity and surface tension for use in ink jet printing, comprising:

a) a first colorant comprising at least two fluorescent dyes which fluoresce by a process involving cascading energy from one of said dyes to another and at least one fluorescent dye emits light within a characteristic emission band when excited by fluorescent exciting radiation;

b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and c) an aqueous liquid vehicle comprising water and a water-soluble vehicle in sufficient amounts to achieve an ink viscosity and surface tension effective for application of the ink to a substrate in a predetermined pattern by ink jet printing;

wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation.

2. A homogeneous aqueous ink capable of producing dark, machine-readable markings exhibiting fluorescence when exposed to fluorescent-exciting radiation, said ink being of suitable viscosity and surface tension for use in ink jet printing, comprising:

a) a first colorant comprising at least one fluorescent dye, said fluorescent dye emitting light within a characteristic emission band when excited by fluorescent-exciting radiation;

b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and c) an aqueous liquid vehicle comprising water and a water-soluble vehicle in sufficient amounts to achieve an ink viscosity and surface tension effective for application of the ink to a substrate in a predetermined pattern by ink jet printing;

wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the net effect between fluorescence and quenching by the other components of the ink when dry provides a phosphor meter reading of at least 7 PMU.

3. A homogeneous aqueous ink capable of producing dark, machine-readable markings exhibiting fluorescence when exposed to fluorescent-exciting radiation, said ink being of suitable viscosity and surface tension for use in ink jet printing, comprising:

a) a first colorant comprising at least one fluorescent dye, said fluorescent dye emitting light within a characteristic emission band when excited by fluorescent-exciting radiation;

b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and c) an aqueous liquid vehicle comprising water and a water-soluble vehicle in sufficient amounts to achieve an ink viscosity and surface tension effective for application of the ink to a substrate in a predetermined pattern by ink jet printing;

wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the ink when dry will exhibit a print reflective difference is greater than 0.25 for white and kraft paper with the red and green filters.

4. A homogeneous aqueous ink capable of producing dark, machine-readable markings exhibiting fluorescence when exposed to fluorescent-exciting radiation, said ink being of suitable viscosity and surface tension for use in ink jet printing, comprising:

a) a first colorant comprising at least one fluorescent dye, said fluorescent dye emitting light within a characteristic emission band when excited by fluorescent-exciting radiation;

b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and c) an aqueous liquid vehicle comprising water and a water-soluble vehicle in sufficient amounts to achieve an ink viscosity and surface tension effective for application of the ink to a substrate in a predetermined pattern by ink jet printing;

wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the ink when dry will exhibit a blackness, which on the CIE scale shows L values of less than 57, a values of less than 5, and b values of less than 5, for white paper.

5. A homogeneous aqueous ink capable of producing dark, machine-readable markings exhibiting fluorescence when exposed to fluorescent-exciting radiation, said ink being of suitable viscosity and surface tension for use in ink jet printing, comprising:

a) a first colorant comprising at least one fluorescent dye, said fluorescent dye emitting light within a characteristic emission band when excited by fluorescent-exciting radiation;

b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and c) an aqueous liquid vehicle comprising water and a water-soluble vehicle in sufficient amounts to achieve an ink viscosity and surface tension effective for application of the ink to a substrate in a predetermined pattern by ink jet printing;

wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein, within the spectral range of interest of from 400 to 680 nm, the ink reflectance is less than 50% of the paper reflectance.

6. A homogeneous aqueous ink capable of producing dark, machine-readable markings exhibiting fluorescence when exposed to fluorescent-exciting radiation, said ink being of suitable viscosity and surface tension for use in ink jet printing, comprising:

a) a first colorant comprising a mixture of red and yellow dyes and comprising at least one fluorescent dye, said fluorescent dye emitting light within a characteristic emission band when excited by fluorescent-exciting radiation;

b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and c) an aqueous liquid vehicle comprising water and a water-soluble vehicle in sufficient amounts to achieve an ink viscosity and surface tension effective for application of the ink to a substrate in a predetermined pattern by ink jet printing;

wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation.

7. A homogeneous aqueous ink capable of producing dark, machine-readable markings exhibiting fluorescence when exposed to fluorescent-exciting radiation, said ink being of suitable viscosity and surface tension for use in ink jet printing, comprising:
   a) a first colorant comprising at least one fluorescent dye, said fluorescent dye emitting light within a characteristic emission band when excited by fluorescent-exciting radiation;
   b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and
   c) an aqueous liquid vehicle comprising water and a water-soluble vehicle in sufficient amounts to achieve an ink viscosity and surface tension effective for application of the ink to a substrate in a predetermined pattern by ink jet printing;
wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the net effect between fluorescence and quenching by the other components that when dry after a draw down on white envelope substrate exhibits a fluorescent intensity of 50 to 99+ PMU.

8. A homogeneous aqueous ink capable of producing dark, machine-readable markings exhibiting fluorescence when exposed to fluorescent-exciting radiation, said ink being of suitable viscosity and surface tension for use in ink jet printing, comprising:
   a) a first colorant comprising at least one fluorescent dye, said fluorescent dye emitting light within a characteristic emission band when excited by fluorescent-exciting radiation;
   b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and
   c) an aqueous liquid vehicle comprising water and a water-soluble vehicle in sufficient amounts to achieve an ink viscosity and surface tension effective for application of the ink to a substrate in a predetermined pattern by ink jet printing;
wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the net effect between fluorescence and quenching by the other components that when dry after a postage meter imprint is produced with a resolution of 160×480 dots per inch of a solid area on white envelope substrate exhibits a fluorescent intensity of 39 to 69 PMU.

9. A homogeneous aqueous ink capable of producing dark, machine-readable markings exhibiting fluorescence when exposed to fluorescent-exciting radiation, said ink being of suitable viscosity and surface tension for use in ink jet printing, comprising:
   d) a first colorant comprising at least one fluorescent dye, said fluorescent dye emitting light within a characteristic emission band when excited by fluorescent-exciting radiation;
   e) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and
   f) an aqueous liquid vehicle comprising water and a water-soluble vehicle in sufficient amounts to achieve an ink viscosity and surface tension effective for application of the ink to a substrate in a predetermined Pattern by ink jet printing;
wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the net effect between fluorescence and quenching by the other components that when dry after a high resolution printer produces a solid area with a resolution of 1440×720 dots per inch of a solid area on white envelope substrate exhibits a fluorescent intensity of 19 to 39 PMU.

10. A homogeneous aqueous ink capable of producing dark, machine-readable markings exhibiting fluorescence when exposed to fluorescent-exciting radiation, said ink being of suitable viscosity and surface tension for use in ink jet printing, comprising:
   a) a first colorant comprising at least one fluorescent dye, said fluorescent dye emitting light within a characteristic emission band when excited by fluorescent-exciting radiation;
   b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and
   c) an aqueous liquid vehicle comprising water and a water-soluble vehicle in sufficient amounts to achieve an ink viscosity and surface tension effective for application of the ink to a substrate in a predetermined pattern by ink jet printing;
wherein, the colorants are present in combination in the aqueous ink in amounts effective to cause the ink, when dry, to exhibit a dark color due to the net absorption spectra of the colorants in the visual, range and machine-readable or visually-discernable fluorescence when subjected to fluorescent-exciting radiation; and wherein the colorants are selected such that the net effect between fluorescence and quenching by the other components that when dry after a high resolution printer produces a solid area with a resolution of 1440×720 dots per inch at a solid area on kraft paper substrate exhibits a fluorescent intensity of 19 to 32 PMU.

11. A homogeneous aqueous ink capable of producing dark, machine-readable markings exhibiting fluorescence when exposed to fluorescent-exciting radiation, said ink being of suitable viscosity and surface tension for use in ink jet printing, comprising:
   a) a first colorant comprising at least one fluorescent dye, said fluorescent dye emitting light within a characteristic emission band when excited by fluorescent-exciting radiation;
   b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and
   c) an aqueous liquid vehicle comprising water and a water-soluble vehicle in sufficient amounts to achieve an ink viscosity and surface tension effective for application of the ink to a substrate in a predetermined pattern by ink jet printing;
wherein the colorants are present in combination in the aqueous ink jet amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the net effect between fluorescence and quenching by the other components that when dry after a high resolution printer produces a solid area with a resolution of 1440×720 dots per inch of a solid area on white envelope substrate exhibits a fluorescent w Fluoromax-2 Fluorescent Spectrophotometer of 96,482 to 232,643 counts per second.

12. A homogeneous aqueous ink capable of producing dark, machine-readable markings exhibiting fluorescence when exposed to fluorescent-exciting radiation, said ink being of suitable viscosity and surface tension for use in ink jet printing, comprising:
   a) a first colorant comprising at least one fluorescent dye, said fluorescent dye emitting light within a characteristic emission band when excited by fluorescent-exciting radiation;
   b) a second colorant having a light absorption band at longer wavelengths than the characteristic emission band of the first colorant, said second colorant comprising a water-soluble polymeric dye of effective molecular configuration to inhibit quenching of fluorescence of said first colorant due to collisional and resonance energy transfer with said second colorant; and
   c) an aqueous liquid vehicle comprising water and a water-soluble vehicle in sufficient amounts to achieve an ink viscosity and surface tension effective for application of the ink to a substrate in a predetermined pattern by ink jet printing;
wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation; and wherein the colorants are selected such that the net effect between fluorescence and quenching by the other components when dry after a high resolution printer produces a solid area with a resolution of 1440×720 dots per inch on kraft envelope substrate exhibits fluorescent intensity when measured with a Fluoromax-2 Fluorescent Spectrophotometer of 106,576 to 242,180 counts per second.

13. A process for preparing an ink described in claims 1, 2, 3, 4, 5, 6, 7, 8, 9, 10, 11, or 12 the process comprising: admixing the first and second colorants, in combination in amounts effective to cause the ink, when dry, to exhibit a dark color due to the net absorption spectra of the colorants in the visual range and machine-readable fluorescence when subjected to fluorescent-exciting radiation, with the aqueous liquid vehicle in sufficient amounts to achieve an ink viscosity of less than 15 centipoise and surface tension effective for application of the ink to a substrate in a predetermined pattern by ink jet printing the colorants are present.

14. A printing process comprising: applying an ink as described in claims 1, 2, 3, 4, 5, 6, 7, 8, 9, 10, 11, or 12 a substrate by ink jet printing.

15. A substrate bearing an image printed with the ink of claims 1, 2, 3, 4, 5, 6, 7, 8, 9, 10, 11, or 12.

16. An ink according to claims 2, 3, 4, or 5 wherein the first colorant comprises at least two dyes which fluoresce by a process involving cascading energy from one of said dyes to another.

17. An ink according to claims 1, 3, 4, or 5 wherein the colorants are selected such that the net effect between fluorescence and quenching by the other components of the ink when dry provides a phosphor meter reading of at least 7 PMU.

18. An ink according to claims 1, 2, 4, or 5 wherein the colorants are selected such that the ink when dry will exhibit a print reflective difference greater than 0.25 for white and kraft paper with the red and green filters.

19. An ink according to claims 1, 2, 3, or 5 wherein the colorants are selected such that the ink when dry will exhibit a blackness, which on the CIE scale shows L values of less than 57, a values of less than +5 and b values of less than 5, for white paper.

20. An ink according to claims 1, 2, 3, or 4 wherein, within the spectral range of interest of from 400 to 680 nm, the ink reflectance is less than 50% of the paper reflectance.

21. An ink according to claims 1, 2, 3, 4, or 5 wherein the first colorant comprises a mixture of red and yellow dyes.

22. An ink according to claims 1, 2, 3, 4, 5, or 6 wherein the colorants are selected such that the net effect between fluorescence and quenching by the other components that when dry after a draw down on white envelope substrate exhibits a fluorescent intensity of 50 to 99+ PMU.

23. An ink according to claims 1, 2, 3, 4, 5, or 6 wherein the colorants are selected such that the net effect between fluorescence and quenching by the other components that when dry after a postage meter imprint is produced with a resolution of 160×480 dots per inch of a solid area on white envelope substrate exhibits a fluorescent intensity of 39 to 69 PMU.

24. An ink according to claims 1, 2, 3, 4, 5, or 6 wherein the colorants are selected such that the net effect between fluorescence and quenching by the other components that when dry after a high resolution printer produces a solid area with a resolution of 1440×720 dots per inch of a solid area on white envelope substrate exhibits a fluorescent intensity of 19 to 39 PMU.

25. An ink according to claims 1, 2, 3, 4, 5, or 6 wherein the colorants are selected such that the net effect between fluorescence and quenching by the other components that when dry after a high resolution printer produces a solid area with a resolution of 1440×720 dots per inch of a solid area on kraft paper substrate exhibits a fluorescent intensity of 19 to 32 PMU.

26. An ink according to claims 1, 2, 3, 4, 5, or 6 wherein the colorants are selected such that the net effect between fluorescence and quenching by the other components that when dry after a high resolution printer produces a solid area with a resolution of 1440×720 dots per inch of a solid area on white envelope substrate exhibits a fluorescent intensity when measured with a Fluoromax-2 Fluorescent Spectrophotometer of 96,482 to 232,643 counts per second.

27. An ink according to claims 1, 2, 3, 4, 5, or 6 wherein the colorants are selected such that the net effect between fluorescence and quenching by the other components when dry after a high resolution printer produces a solid area with a resolution of 1440×720 dots per inch on kraft envelope substrate exhibits fluorescent intensity when measured with a Fluoromax-2 Fluorescent Spectrophotometer of 106,576 to 242,180 counts per second.

28. An ink according to claims 1, 2, 3, 4, 5, 6, 7, 8, 9, 10, 11, or 12 wherein the second colorant comprises a water-soluble dye.

29. An ink according to claims 1, 2, 3, 4, 5, 6, 7, 8, 9, 10, 11, or 12 wherein the first colorant comprises red-fluorescent dye.

30. An ink according to claims 1, 2, 3, 4, 5, 6, 7, 8, 9, 10, 11, or 12 wherein the viscosity is less than 15 centipoise.

31. An ink according to claims 1, 2, 3, 4, 5, 6, 7, 8, 9, 10, 11, or 12 wherein the second colorant comprises a polymeric blue dye.

32. An ink according to claims 1, 2, 3, 4, 5, 6, 7, 8, 9, 10, 11, or 12 which further comprises a fluorescence stabilizer.

33. An ink according to claims 1, 2, 3, 4, 5, 6, 7, 8, 9, 10, 11, or 12 which further comprises a surfactant.

34. An ink according to claims 1, 2, 3, 4, 5, 6, 7, 8, 9, 10, 11, or 12 wherein said polymeric dye of said second colorant comprises polymer chains which are sufficiently hydrophilic to confer water solubility on the dye and sufficiently large to provide a dye molecule with a radius of at least about 20 Angstrom units.

35. An ink according to claims 1, 2, 3, 4, 5, 6, 7, 8, 9, 10, 11, or 12 wherein the ionic characters of the water-soluble dyes are the same.

36. An ink according to claim 30 suitable for thermal ink jet printing wherein the viscosity is from 1 to 5 centipoise.

37. An ink according to claim 30 suitable for piezoelectric ink jet printing wherein the viscosity is from 2 to 4 centipoise.

38. An ink according to claim 37 suitable for piezoelectric ink jet printing wherein the surface tension is within the range of from 20 to 80 dyne/cm.

39. An ink according to claim 36 suitable for thermal ink jet printing wherein the surface tension is within the range of from 30 to 50 dyne/cm.

40. An ink according to claim 32 wherein the fluorescence stabilizer comprises a dipolar aprotic solvent with a dielectric constant>ca. 20 or high value of Hildebrand solubility parameter, $\delta > 10$ $MPa^{1/2}$.

41. An ink according to claim 32 wherein the fluorescence stabilizer comprises a member selected from the group consisting of N,N-Dimethylacetamide, Sulfolane, Formamide, Methylphenyl sulfoxide, N-Methylpyrrolidinone, 4-Methylmorpholine-N-oxide (MMNO), and DMSO (Dimethylsulfoxide).

* * * * *